United States Patent
Ostendorp

(10) Patent No.: US 7,392,585 B2
(45) Date of Patent: Jul. 1, 2008

(54) METHOD FOR ELECTRICALLY AND MECHANICALLY CONNECTING AND DISCONNECTING A POWER LINE

(75) Inventor: Markus Ostendorp, North Richland Hills, TX (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 11/477,072

(22) Filed: Jun. 27, 2006

(65) Prior Publication Data
US 2006/0246761 A1 Nov. 2, 2006

Related U.S. Application Data

(62) Division of application No. 11/199,769, filed on Aug. 8, 2005, now abandoned, which is a division of application No. 10/742,249, filed on Dec. 19, 2003, now Pat. No. 6,971,898.

(60) Provisional application No. 60/529,236, filed on Dec. 11, 2003.

(51) Int. Cl.
*H01R 43/00* (2006.01)
(52) U.S. Cl. .............. 29/857; 29/863; 29/869; 174/40 CC; 439/369
(58) Field of Classification Search .......... 29/825, 29/857, 861–865, 869; 174/40 CC, 40 R, 174/40 TD, 43, 44, 45 R, 51, 52.1, 65 R; 439/101, 108, 258, 301, 302, 345–348, 357, 439/358, 369, 474, 643, 923, 924.1
See application file for complete search history.

(56) References Cited

U.S. PATENT DOCUMENTS

| 870,471 | A |   | 11/1907 | Sohnaufer et al. |
|---|---|---|---|---|
| 3,242,455 | A | * | 3/1966 | Horvath et al. ............... 439/651 |
| 4,195,192 | A |   | 3/1980 | Hackney et al. |
| 4,698,717 | A | * | 10/1987 | Scheid ........................ 439/923 |
| 5,194,013 | A | * | 3/1993 | Propp ......................... 439/102 |
| 5,315,064 | A | * | 5/1994 | Andrews ................. 174/40 TD |
| 5,623,122 | A |   | 4/1997 | Anderson et al. |
| 6,383,003 | B1 | * | 5/2002 | Corona ....................... 439/278 |

(Continued)

OTHER PUBLICATIONS

International Search Report mailed Sep. 6, 2005 corresponding to PCT/US04/39856.

(Continued)

*Primary Examiner*—Donghai D. Nguyen
(74) *Attorney, Agent, or Firm*—Kilpatrick Stockton LLP

(57) ABSTRACT

The present invention provides an apparatus for connecting two pairs of conductors and one pair of ground wires and for allowing separation of the same upon the application of a tensional force upon at least one of the conductors or ground wires. The apparatus comprises two plates that each defines three holes configured to receive two conductors and a ground wire, wherein the plates are positioned adjacent to each other such that the respective holes in each plate are aligned such that the conductors and ground wires coming from each plate would be in physical contact. Three connectors hold the plates together. The first two connectors are configured to release the plates upon the application of a tensional force on the conductors or ground wires before the third connector releases the plates, thereby separating the conductors before separating the ground wires. Another embodiment addresses the same in multi-service connections.

15 Claims, 15 Drawing Sheets

U.S. PATENT DOCUMENTS 6,461,192 B1 * 10/2002 Kwoka ........................ 439/923

OTHER PUBLICATIONS

Written Opinion of the International Searching Authority mailed Sep. 6, 2005 corresponding to PCT/US04/39856.

Stewart, G., et al., "Distribution Area Technology Applications Success Service Drop MiniPOD", Electrical Power Research Institute, Inc., 2005.

Loggins, J. et al., "MiniPOD Protects Utility and Customer from Service Drop Teardowns", Dec. 1, 2004.

Supplementary European Search Report mailed Jan. 10, 2008 corresponding to EP 04 81 2388.

* cited by examiner

METHOD FOR ELECTRICALLY AND MECHANICALLY CONNECTING AND DISCONNECTING A POWER LINE

This application is a divisional application of U.S. patent application Ser. No. 11/199,769, filed Aug. 8, 2005, now abandoned which is a divisional application of U.S. patent application Ser. No. 10/742,249, filed Dec. 19, 2003, now U.S. Pat. No. 6,971,898, which claims the benefit of U.S. Provisional Application No. 60/529,236, filed Dec. 11, 2003. Each of the foregoing applications is incorporated by reference herein in its entirety.

BACKGROUND OF THE INVENTION

1. Field of the Invention

The present invention relates generally to electric power lines. More specifically, the invention relates to an apparatus and method for mechanically and electrically disconnecting a service drop power line.

2. Description of Related Art

Power outages not only inconvenience utility customers but may severely damage the utility company's service hardware and any structure attached to the utility lines, as well as creating a hazard with the possibility of dropping a live electrical wire. When such damage occurs, it is often costly for the utility company to repair and replace parts but also costly when such damage causes long delays in restoring power service.

For power outages stemming from the utility companies' efforts to increase energy transmission over existing transmission and distribution lines, some companies have replaced existing conductors with larger ones. This may cause the towers holding such conductors to structurally fail because larger mechanical loads have been imposed upon these towers than intended by their original design. When the towers do fail, the failure may damage or destroy a number of towers, which may cause long delays in restoring power service. To avoid replacing towers to handle the larger loads imposed, various load limiters have been implemented to limit the horizontal component of force to which the tower is subjected. These load limiters allow the power line to drop to the ground when the a particular amount of force is exceeded, thereby avoiding damage to the tower. However, some of these load limiters release the power line prematurely or fail to release the power line after the set amount of force is exceeded. In addition, once the load limiter releases the power line, the entire device must be replaced since the load limiter is not reusable, which is a costly and time consuming ordeal.

A significant number of power outages, however, occur at the service end of the residential power delivery system, i.e., at the service drop power line from the utility transmission or distribution line to a customer's building. For example, such outages may be caused by trees or branches falling on the service drop power line connected to the customer's building. When the tree limb falls on the service drop power line, there is a sudden increase in the tension that may result in damage to the structure and service hardware attached to the building or to the structure and service hardware attached to the utility pole. For example, tension on a service drop power line may pull the standpipe off of the building roof or side and may structurally damage the roof or side as well. Further, tension on the service drop power line may cause damage to a transformer located on the service pole. Moreover, should the service drop power line disconnect from the building, the resulting power line, which could be laying on the ground, may still be energized, thereby causing a potentially dangerous situation. Therefore, there is a need for an improved device to disconnect power lines upon the application of a force sufficient to cause damage to structurally components attached to or holding the power line. Further, there is a need for an improved device with the ability to disconnect one or more multiple power lines in a system having multiple service drop power lines, without disconnecting other non-stressed power lines.

SUMMARY OF THE INVENTION

In view of the above, the present invention provides an apparatus and method that safely and effectively disconnects power lines upon the application of a force to the power lines. The disconnection of the power lines is designed to drop the stressed power line to the ground in a controlled fashion. The dropped power line is no longer energized, making it safe for utility company service crew to reconnect the line later. Such a controlled disconnection also reduces the possibility of damage to equipment or structure to which the power lines are attached.

The present invention also provides an apparatus and method that is cost-efficient to implement since the apparatus is reusable. After the power lines have been disconnected, the utility service crew merely has to reconnect the fallen wires and place the apparatus back together, without making significant repairs to the service hardware or structural components. This design aspect enables quick restoration of power, which reduces cost by limiting downtime and reducing potentially costly service hardware replacement.

These objectives of the present invention are provided by an apparatus and method for electrically connecting a power line to a piece of equipment or to a structure and allows the power line to disconnect from that equipment or structure upon receiving a given amount of tensional force before such tension causes damage to the equipment or structure. More specifically, in one embodiment, the present invention is placed between one end of a power line and a second, much shorter, power line that is directly connected to a piece of electrical equipment or structure. The present invention provides an electrical connection between the two power lines and, upon receipt of a tensional force on the power line, allows the one power line to disconnect from the shorter power line before the tension on the power line can cause damage to the equipment or structure.

The present invention provides an apparatus for connecting two pairs of conductors and one pair of ground wires and for allowing separation of the same upon the application of a tensional force upon at least one of the conductors or ground wires. In one embodiment the apparatus comprises: a first plate defining a first hole configured to receive a first conductor, a second hole configured to receive a second conductor and a third hole configured to receive a ground wire; a second plate defining a first hole configured to receive a third conductor, a second hole configured to receive a fourth conductor, and a third hole configured to receive a second ground wire, wherein the second plate is positioned adjacent to the first plate such that the first, second and third holes in the first plate are aligned, respectively, with the first, second and third holes in the second plate such that the first and third conductors would be in physical contact, the second and fourth conductors would be in physical contact, and the first and second ground wires would be in physical contact. A first connector holds the first and the second plates together, and the first connector is positioned proximate to the first holes in the first and second plates. A second connector holds the first and second plates together, and the second connector is positioned proximate to the second holes in the first and second plates. A third connector holds the first and second plates together, and the third connector is positioned more proximate to the third holes in the first and second plates than to the first and second holes of the first and second plates. The first and second connectors are configured to release the first plate from the second plate upon the application of a tensional force on the first, second, third or fourth conductor or on the first or second ground wire before the third connector releases the first plate from the second plate, thereby separating the first conductor from the third conductor and the second conductor from the fourth conductor before separating the first ground wire from the second ground wire.

In another embodiment, the apparatus comprises: a first plate having a center, a first extension region extending radially from the center of the first plate and defining a first extension region hole in the first plate, a second extension region extending radially from the center of the first plate and defining a second extension region hole in the first plate, and a third extension region extending radially from the center of the first plate, wherein the first, second and third extension regions are equally spaced about a perimeter of the first plate. The second plate is positioned adjacent to the first plate and having a center, a first extension region extending radially from the center of the second plate and defining a first extension region hole in the second plate, a second extension region and a third extension region, each extending radially from the center of the second plate extending radially from the center of the second plate and defining a second extension region hole in the second plate, and a third extension region extending radially from the center of the second plate, wherein the first, second and third extension regions are equally spaced about a perimeter of the second plate. A first connector is attached to the first extension region of the first plate and to the first extension region of the second plate. A second connector is attached to the second extension region of the first plate and to the second extension region of the second plate. A third connector is attached to the third extension region of the first plate and to the third extension region of the second plate, wherein the third connector is configured to provide a more secure connection than the first and second connectors. Further, the first and second extension region holes in the first plate are aligned with the first and second extension region holes in the second plate, respectively.

The present invention also provides a system for connecting two pairs of conductors and one pair of ground wires and for allowing separation of the same upon the application of a tensional force upon at least one of the conductors or ground wires. In one embodiment the system comprises: a first plate defining a first hole configured to receive a first conductor, a second hole configured to receive a second conductor, and a third hole configured to receive a ground wire; a second plate defining a first hole configured to receive a third conductor, a second hole configured to receive a fourth conductor, and a third hole configured to receive a second ground wire, wherein the second plate corresponds positionally to the first plate such that the first, second and third holes in the first plate are aligned, respectively, with the first, second and third holes in the second plate such that the first and third conductors are electrically connected, the second and fourth conductors are electrically connected, and the first and second ground wires are electrically connected. A first connector is configured to hold the first and second plates together at a first position proximate to the first hole in the first plate and the first hole in the second plate. A second connector configured to hold the first and second plates together at a second position proximate to the second hole in the first plate and the second hole in the second plate. A third connector configured to hold the first and second plates together at a third position proximate to the third hole in the first plate and third hole in the second plate. The first and second connectors are configured to release the first plate from the second plate upon the application of a tensional force on the first, second, third or fourth conductor or on the first or second ground wire before the third connector releases the first plate from the second plate, thereby separating the first conductor from the third conductor and the second conductor from the fourth conductor before separating the first ground wire from the second ground wire.

Additionally, the present invention also provides an apparatus for connecting two pairs of conductors and one pair of ground wires and for allowing separation of the same upon the application of a tensional force upon at least one of the conductors or ground wires. In one embodiment, the apparatus comprises: a first member defining a first hole configured to receive a first conductor, a second hole configured to receive a second conductor and a third hole configured to receive a ground wire; a second member defining a first hole configured to receive a third conductor, a second hole configured to receive a fourth conductor, and a third hole configured to receive a second ground wire, wherein the second member is positioned adjacent to the first member such that the first, second and third holes in the first member are aligned, respectively, with the first, second and third holes in the second member such that the first and third conductors would be in physical contact, the second and fourth conductors would be in physical contact, and the first and second ground wires would be in physical contact. A first connector holds the first and second members together and positioned proximate to the first holes in the first and second members. A second connector holds the first and second members together and positioned proximate to the second holes in the first and second members. A third connector holds the first and second members together and positioned more proximate to the third holes in the first and second members than to the first and second holes of the first and second members. Further, the first and second connectors are configured to release the first member from the second member upon the application of a tensional force on the first, second, third or fourth conductor or on the first or second ground wire before the third connector releases the first member from the second member, thereby separating the first conductor from the third conductor and the second conductor from the fourth conductor before separating the first ground wire from the second ground wire.

Moreover, the present invention provides a method for electrically and mechanically separating two pairs of conductors and one pair of ground wires upon the application of a tensional force upon at least one of the conductors or ground wires. In one embodiment the method comprises: receiving a tensional force on a service drop line comprising two conductors and a ground wire attached to a corresponding pair of conductors and a corresponding ground wire extending from a utility pole; physically and electrically separating each of the two conductors from the corresponding pair of conductors extending from the utility pole; and subsequently physically and electrically separating the ground wire from the corresponding ground wire extending from the utility pole.

In a multi-service arrangement, the present invention also provides an apparatus for connecting a plurality of conductors and a plurality of ground wires and for allowing separation of the same upon the application of a tensional force upon at least one of the conductors or ground wires. In one embodiment, the present invention comprises: a plurality of crimp-on connectors configured to receive the conductors and the ground wires; a box having a plurality of holes configured to receive the crimp-on connectors on a first surface of the box, in which the box is attached to a first location on a utility pole; at least one mechanical breakaway device configured to receive one of the ground wires, in which the mechanical breakaway device is attached to a second location on the utility pole; and wherein the mechanical breakaway device releases the received ground wire first upon an application of a tensional force on the conductors or the ground wires, such that the tensional force on the conductors then increases on the conductors, thereby pulling the crimp-on connectors out of the box and releasing the conductors and the ground wires that are attached to the crimp-on connectors.

Furthermore, the present invention also provides an apparatus for connecting a plurality of conductors and a plurality of ground wires and for allowing separation of the same upon the application of a tensional force upon at least one of the conductors or ground wires. In one embodiment, the present invention comprises: a plurality of crimp-on connectors configured to receive the conductors and the ground wires; a structure with a first surface attached to a first location on a utility pole; a plurality of tubular members attached to a second surface of the structure, wherein the tubular members are configured to receive the crimp-on connectors; at least one mechanical breakaway device configured to receive one of the ground wires, in which the mechanical breakaway device is attached to a second location on the utility pole; and wherein the mechanical breakaway device releases the received ground wire first upon an application of a tensional force on the conductors or the ground wires, such that the tensional force on the conductors then increases on the conductors, thereby pulling the crimp-on connectors out of the tubular members and releasing the conductors that are attached to the crimp-on connectors.

In addition, the present invention provides a method for electrically and mechanically separating a plurality of conductors and a ground wire in a multiple service installation system upon the application of a tensional force upon at least one of the conductors or said ground wire. In one embodiment, the present invention comprises: receiving a tensional force on a service drop line comprising a plurality of conductors and a ground wire, wherein said conductors and ground wire are attached in separate locations along a utility pole; physically and electrically separating said ground wire from said utility pole first; subsequently physically and electrically separating said conductors from said utility pole; and wherein other service drop lines do not receive a tensional force and do not physically and electrically separate.

DESCRIPTION OF THE PREFERRED EMBODIMENTS

Typically a power line, such as an overhead power line or a service drop line, is directly connected at one end to a piece of electrical equipment or a structure, such as a utility pole or transformer and at a second end to another structure, such as the roof of a house or building. Upon receipt of a tensional force on the power line, such as from a falling tree or branch, the tension on the power line may cause the power line to pull on the equipment or structure at either end resulting in damage to such equipment or structure, a loss of power service and a need for potentially costly repairs.

Generally, the present invention provides an apparatus and method for electrically connecting a power line to a piece of equipment or to a structure and allows the power line to disconnect from that equipment or structure upon receiving a given amount of tensional force before such tension causes damage to the equipment or structure. More specifically, in one embodiment, the present invention is placed between one end of a power line and a second, much shorter, power line that is directly connected to a piece of electrical equipment or structure. The present invention provides an electrical connection between the two power lines and, upon receipt of a tensional force on the power line, allows the one power line to disconnect from the shorter power line before the tension on the power line can cause damage to the equipment or structure.

The following text in connection with the Figures describes various embodiments of the present invention. The following description, however, is not intended to limit the scope of the present invention. It should be appreciated that where the same numbers are used in different Figures, these refer to the same element or structure.

Figure 1:
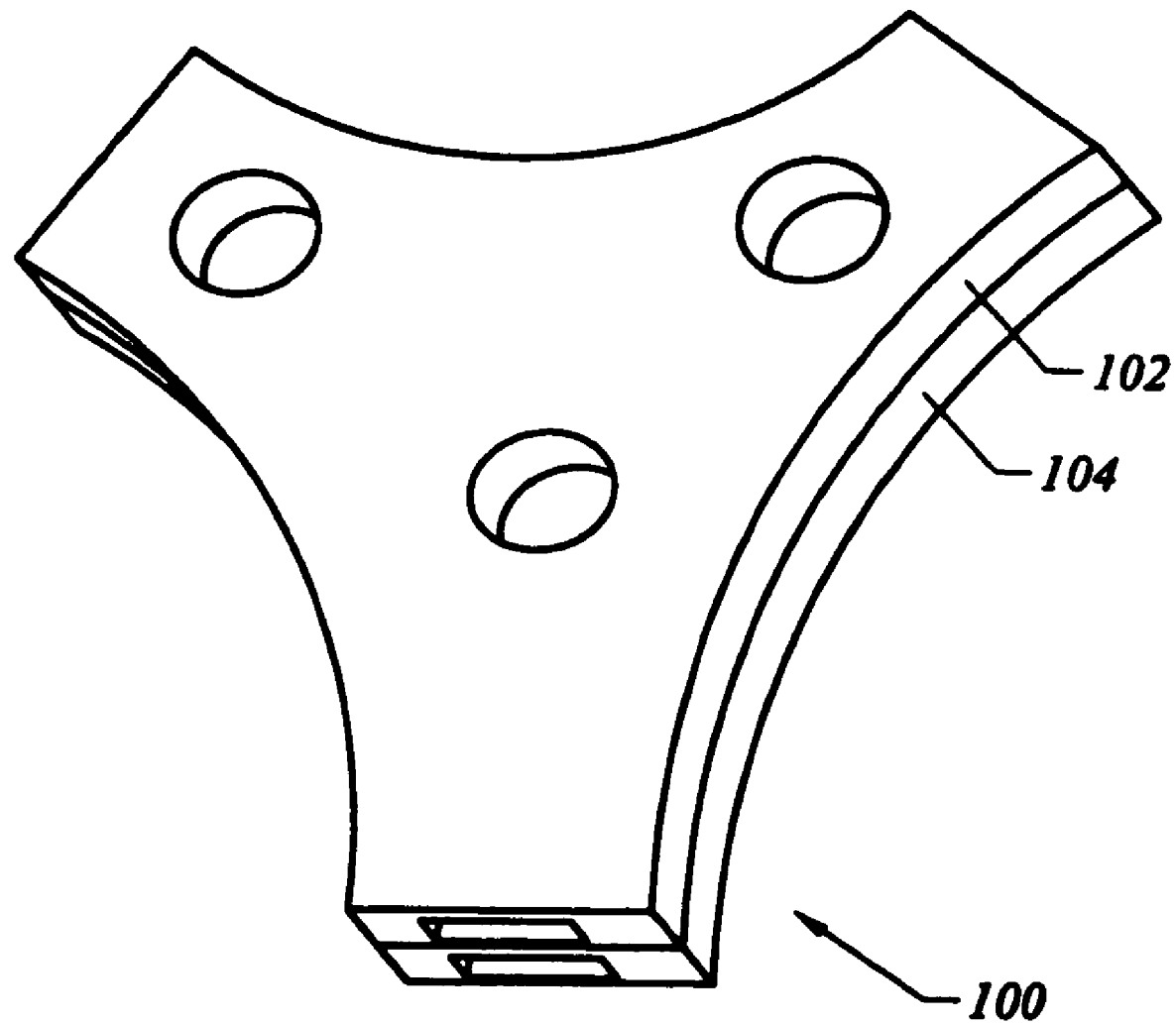
FIG. 1 is a perspective view of an apparatus for connecting and disconnecting one power line to and from another power line, according to one embodiment of the present invention.

FIG. 1 is a perspective view of an apparatus for connecting and disconnecting one power line to and from another power line, according to one embodiment of the present invention. The apparatus provides an electrical connection between the two power lines and allows the power lines to disconnect or separate from one another upon the receipt of a predetermined amount of tensional force on either power line. The apparatus 100 comprises two plates 102, 104, which are similarly or identically shaped and are disposed adjacent to one another. As will be further discussed below, each plate 102, 104 comprises three holes that are aligned when the plates 102, 104 are placed adjacent to each other, thereby providing three holes 216, 218, 220 that pass through from one side of apparatus 100 to the other. Also, as will be further discussed below, connectors (not shown) are used to hold the plates 102, 104 together.

In general operation, and as will be discussed in more detail below, corresponding pairs of power lines or wires, such as phase wires and ground wires, are separately connected to the apparatus 100, i.e., through the holes of each corresponding plate 102, 104 such that when the plates 102, 104 are placed adjacent to each other and held together by the connectors, the corresponding pairs of power lines are electrically connected. For example, one end of a service power drop line comprising two phase wires and one ground wire may be attached to the roof of a house. The other end of this power line may be connected to the holes of one plate 102. One end of a corresponding set of shorter length phase and ground wires may be attached to the holes of the second plate 104, and the other end of these wires may at attached directly to a transformer on the utility pole. The two plates 102, 104 are then placed together, thereby creating an electrical connection between the corresponding pairs of phase wires and the ground wire through the holes of each plate 102, 104.

Upon the application of a predetermined amount of tensional force upon, for example, that portion of the power line extending to the house, the connectors are designed to allow the plates 102, 104 to separate from each other, thereby mechanically and electrically disconnecting the corresponding pairs of wires before any tension on the power line can damage the transformer, utility pole or the house. In essence, upon separation of the plates 102, 104, the service drop power line would essentially fall away from the utility pole to the ground, thereby avoiding any transfer of tension to the transformer, utility pole or house. In addition the service drop power line that falls would be electrically disconnected and, therefore, not electrically charged. Alternatively, or in addition, the apparatus 100 could be positioned closer to the house rather than to the utility pole such that the ends of a shorter set of wires could be attached to a house and the second ends of these shorter wires would be attached to one of the plates. The second plate would then be connected to the longer length of wires extending from the second plate to the utility pole. Further, an apparatus 100 could be used near the house as well as the utility pole.

Figure 2:
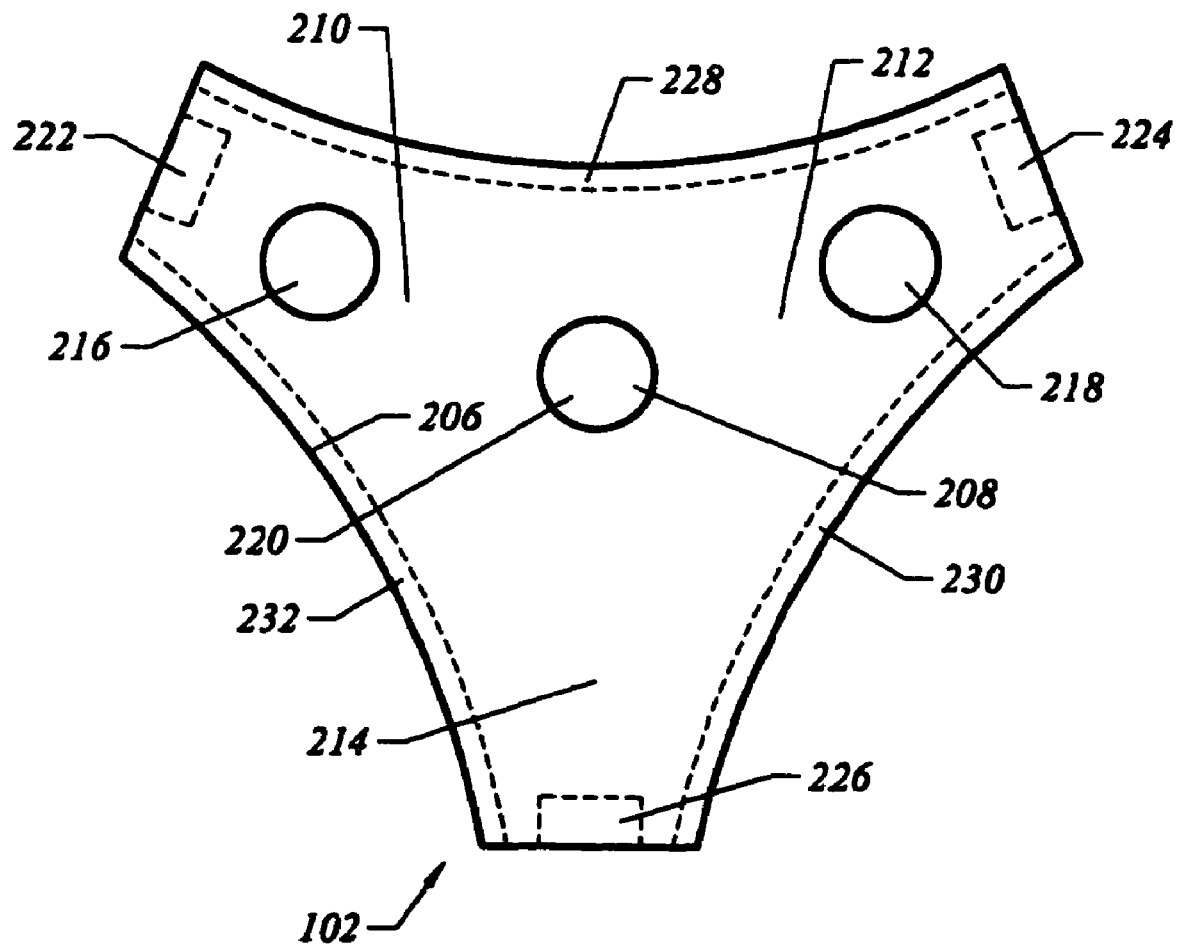
FIG. 2 is a top view of the apparatus of FIG. 1.

FIG. 2 is a top view of a plate from the apparatus of FIG. 1. It should be appreciated that both plates 102, 104 are essentially the same. Therefore, the following description with respect to one plate 102 is equally applicable to the second plate 104.

The plate 102 comprises a body 206 having a center position 208 and three extension regions 210, 212, 214 that are positioned symmetrically about and extend radially from the center position 208. In other words, each of the extension regions 210, 212, 214 are equally spaced about the perimeter of the body 106. In this embodiment, the body 206 has a concave shape between each of the first, second, and third extension regions 210, 212, 214.

The plate 102 further defines three holes 216, 218, 220. Two of the holes 216, 218 are positioned in extension regions 210, 212 respectively, and are preferably positioned between the center position 208 and the perimeter of each respective extension region 201, 212 or even more proximate to the periphery or perimeter of these extension regions or the body 206. The third hole 220 is positioned approximately in the center of the body 206, specifically in the center position 208. Each of the holes 216, 218, 220 are configured to receive a conductor, wire, power line or ground wire. Specifically, the holes 216, 218 positioned in the extension regions 210, 212 are configured to receive conductor wires or phase wires (not shown), and the third center hole 220 is configured to receive a ground wire (not shown).

More specifically, each hole 216, 218, 220 in each plate 102, 104 is configured to receive an end of a conductor, wire, power line or ground wire. In other words, the holes 216, 218, located in the extension regions 210, 212 of one plate 102 are each configured to each receive the end of one of two conductors or phase wires and the center hole 220 of one plate 102 is configured to receive the end of a ground wire. Similarly, the holes 216, 218, in the extension regions 210, 212 of the second plate 104 are each configured to each receive the end of one of two other conductors or phase wires and the center hole 220 of the second plate 104 is configured to receive the end of another ground wire. The plates 102, 104 may then be positioned adjacent to each other such that the holes in one plate 102 are aligned with the holes of the second plate 104. As will be discussed in more detail below, in this arrangement, the ends of the conductors or ground wires in the holes 216, 218, 220 of one plate 102 may be brought into physical contact with the ends of the conductors and ground wire in the corresponding holes of the second plate 104, thereby facilitating an electrical connection between the corresponding conductors and ground wire.

It should be appreciated that, in general, it is preferable to have the two holes 216, 218 located in the extension regions 210, 212 configured to receive conductors or phase wires. In other words, generally, it is preferable to have the conductors or phase wires connected to holes that are located closer to the perimeter or periphery of the body 206 than the hole configured to receive a ground wire, which preferably is located at a position that is closer to the center or interior of the body 206 than the holes that receive the conductors or phase wires. As will be discussed in more detail below, upon receiving a certain amount of tensional force upon any of the conductors or upon the ground wire, the plates 102, 104 will come apart, thereby mechanically and electrically disconnecting the conductors and ground wire. By having the holes 216, 218 that receive the conductors or phase wires located closer to the perimeter or periphery of the body 206, the conductors will separate first before the ground wire connected to the hole 220 that is located closer to the center of the body 206, thereby facilitating a safer disconnection of the conductors. Preferably, the hole 220 configured to receive the ground wire is located equidistance from both the holes 216, 218 configured to receive the conductors or phase wires. The manner in which the ends of the conductors and ground wire are specifically held in place in the holes is discussed below in connection with FIG. 9.

The body 206 of the plate also defines three recesses 222, 224, 226 or openings in the sides of each of the extension regions 210, 212, 214. These recesses 222, 224, 226 are each configured to receive a tab from a clip (not shown). This clip and the tab are discussed in more detail below in connection with FIGS. 4 and 5; however, the clip and tab are just one example of a connector that is used to hold both plates 102, 104 together and to facilitate the release of the plates 102, 104 from each other upon the receipt of a tensional force on the conductors or ground wire.

FIG. 2 also illustrates that the body 206 may contain reinforcing bars 228, 230, 232 positioned along the perimeter of the concave shaped portions of the body 206. In this particular embodiment, there are three curved reinforcing bars 228, 230, 232, one for each concave portion of the body 106. These reinforcing bars 228, 230, 232 provide structural stability to the body 206 and protect the integrity of the body 206 when the plates 102, 104 impact the ground after separating from each other upon the application of a certain amount of tensional force. The reinforcing bars 228, 230, 232 increase the strength of the plates 102, 104 and minimize cracking or chipping of the body 206. This protective function of the reinforcing bars 228, 230, 232 allows the plates 102, 104 to be reused, which will be discussed in greater detail later.

It should be appreciated that although the body 206 is shown as a flat plate, the geometry of the body does not necessarily have to be flat. It should be appreciated that the body may take any shape, and each body may have the same or different shape. However, the geometry of the body should facilitate making an electrical connection between the corresponding pairs of wires attached to the holes in each body when the bodies are positioned adjacent to each other. This is accomplished by a body shape that provides alignment of corresponding holes in each body when the bodies are placed adjacent to each other. Making each body the same shape is advantageous since it only requires one body design to be manufactured. Any number of holes can be used, but preferably the holes are positioned so that upon separation of the two bodies, the conductors are preferably separated before the ground wire. Because of the different possible shapes for the body design, it should be appreciated that the reinforcing bars are not confined to a particular size or geometry but may be used with any body shape.

The body may be made from any material. For example, the plates 102, 104 preferably are made of cast aluminum, steel or other metals pressed or formed from sheet metal, so that the plates can be re-used in the field. Furthermore, since it is possible to use the apparatus of the present invention outside in an unprotected environment, it is desirable to use a material of construction for the plates that would withstand significant deterioration from the surrounding environment or climate, including exposure to sunlight or precipitation. For example, in an environment where the apparatus would be exposed to significant sunlight or heat, it would be desirable to manufacture the plates from materials that would withstand deterioration from UV rays. However, it is important that the conductors and ground wires are electrically isolated from each other. In other words, the plates can either be made from a non-conductive material, or if made from a metallic or conductive material, the connection of the conductors to the plates may be isolated from the body of the plates.

Figure 3:
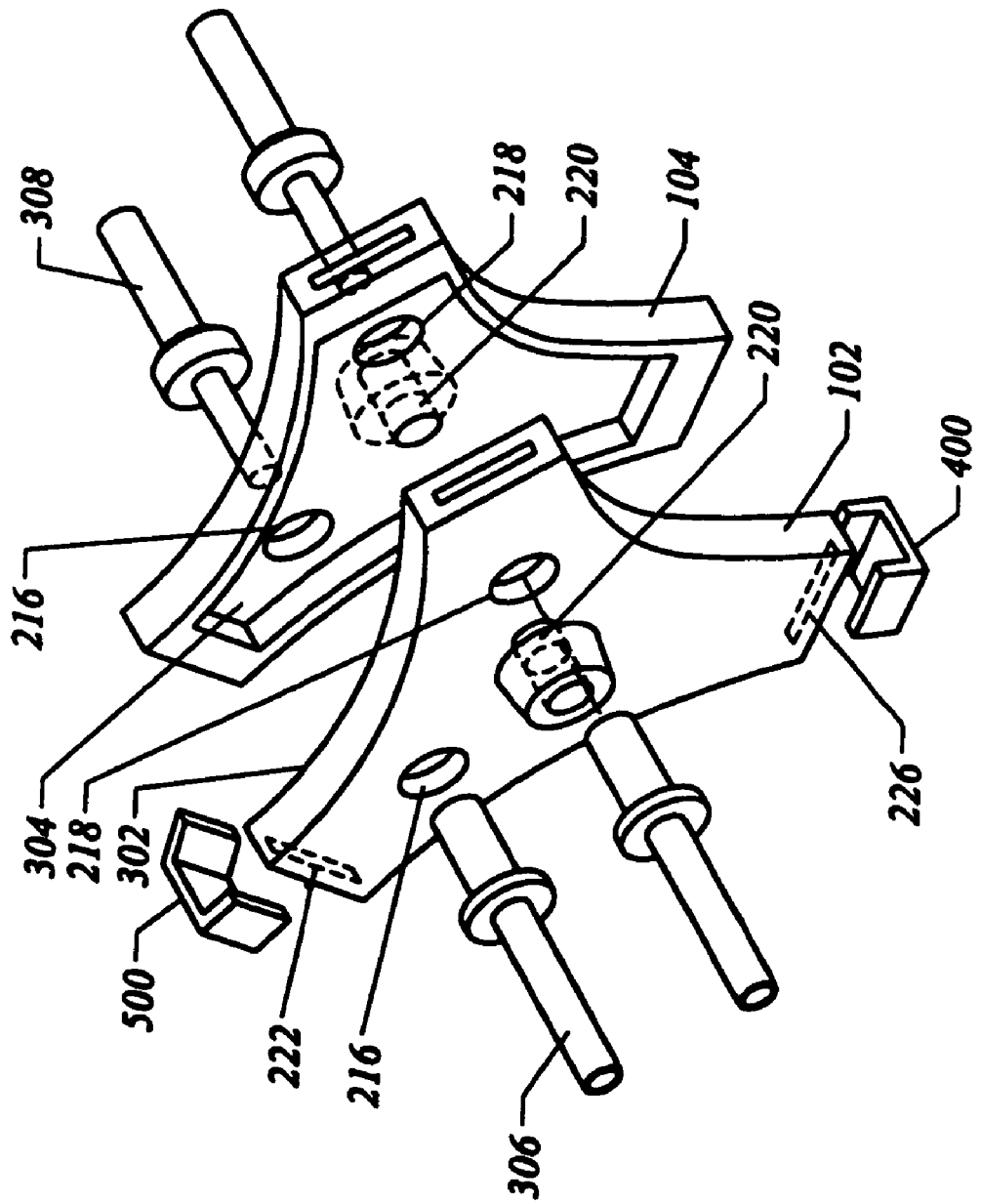
FIG. 3 is an exploded view of the apparatus of FIG. 1.

FIG. 3 is an exploded view of the apparatus of FIG. 1. As illustrated, the two plates 102, 104 are similarly shaped such that when placed adjacent to each other the perimeter of each plate 102, 104, as well as the corresponding holes 216, 218, 220, are substantially aligned. It should be appreciated that at least one surface of the body 206 of each plate 102, 104 is preferably flat to facilitate placing each plate 202, 204 adjacent to one another. In other words, one plate 102 would have at least one flat surface 302 that would be placed adjacent to a corresponding flat surface 304 of the second plate 104. This facilitates the physical and electrical connection between the conductor wires and ground wires. It should be appreciated that it is not critical that the corresponding conductors and ground wires held by each plate 102, 104 actually physically touch each other. Rather, it is simply required that an electrical connection be made between these corresponding pairs of wires.

As shown in FIG. 3, a first conductor 306 is attached adjacent to a hole 216 on the first plate 102 using a male crimp-on connector (not shown), which is described in more detail in connection with FIG. 8. A second conductor 308 is attached adjacent to a hole 216 on the second plate 104 using a female crimp-on connector (not shown), which is described in more detail in connection with FIG. 8. When the plates 102, 104 are brought together, the first conductor 306 and the second conductor 308 then come into electrical contact with each other through a physical connection between the male and female crimp-on connectors. FIG. 3 also shows two connectors 400 and 500 which hold the two plates together. One connector 500 is disposed adjacent to an extension region having a hole 216 for a conductor wire. A second connector 400 is disposed adjacent to an extension region that does not have a hole. A third connector (not shown) similar to the connector 500 adjacent to an extension region is also used to hold the plates 102, 104 together at the perimeter of the other extension region having a hole 218 for a conductor. These connectors are discussed in more detail in connection with FIGS. 4 and 5.

Figure 4:
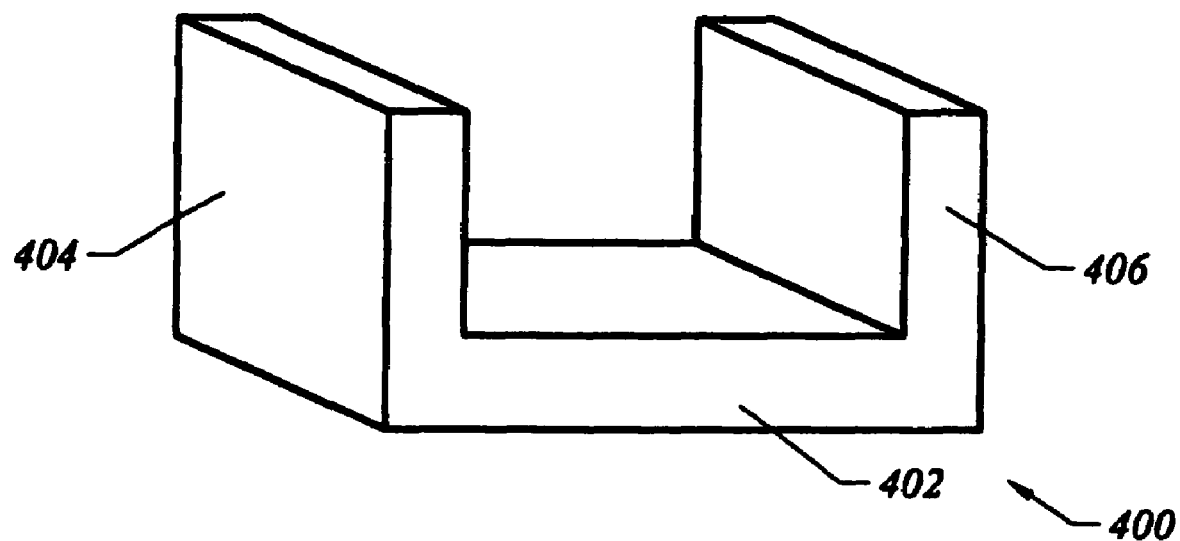
FIG. 4 is a perspective view of one embodiment of a connector of the present invention.

FIG. 4 is a perspective view of one embodiment of a connector of the present invention. The connector 400 comprises a base 402 and two tabs 404, 406 located at opposite ends of the base 402. As shown, both tabs 404, 406 extend from the base at approximately a right angle.

Figure 5:
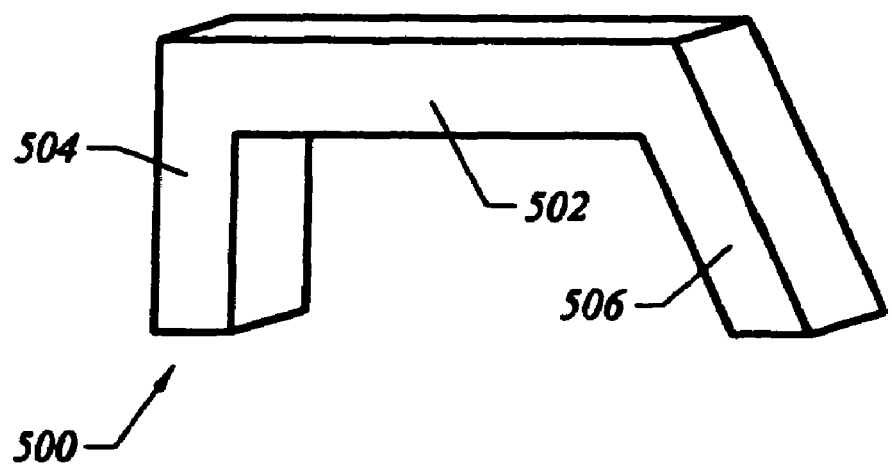
FIG. 5 is a perspective view of an embodiment of another connector of the present invention.

FIG. 5 is a perspective view of one embodiment of another connector of the present invention. The connector 500 comprises a base 502 and two tabs 504, 506 located at opposite ends of the base 502. As shown, one tab 504 extends from the base 502 at approximately a right angle, and the other tab 506 extends from the base 502 at an angle other than a right angle. More specifically, this tab 506 extends from the base at an obtuse angle or an angle preferably greater than a right angle. As will be discussed in more detail below, the angle at which this tab 506 extends from the base, among other things, is important in determining at what tensional load the two plates 102, 104 will separate.

Figure 6:
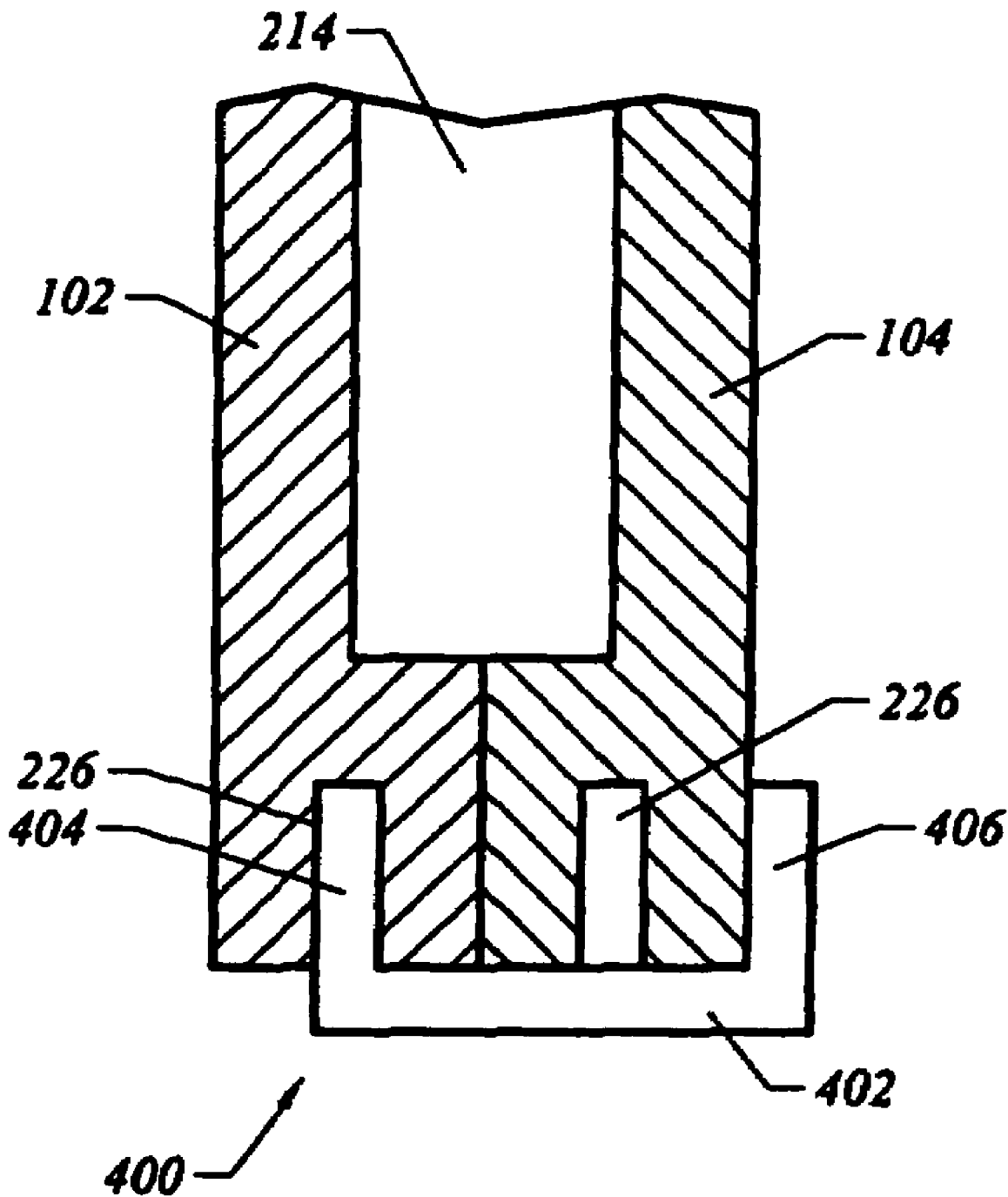
FIG. 6 is a sectional view of a portion of the apparatus of FIG. 1 and the connector of FIG. 4.

FIG. 6 is a sectional view of a portion of the apparatus of FIG. 1 and the connector of FIG. 4. As illustrated, the connector 400 as provided in FIG. 4 holds the plates 102, 104 together by inserting one tab 404 into the recess 226 located at the perimeter of the extension region 214 of the first plate 102 that does not have a hole for receiving a conductor wire. The other tab 406 that is not inserted into the recess 226 contacts the outer surface of the second plate 104 to facilitate a tight fit between the connector 400 and the two plates 102, 104.

In this particular embodiment, it should be appreciated that the design of the connector 400 is symmetrical, which facilitates the insertion of either tab 404, 406 into either recess 226 of either plate 102, 104. As such, it is not imperative that both plates 102, 104 have corresponding recesses since only one tab is inserted into one recess in one plate. However, as explained earlier, there may be significant manufacturing cost savings to make both plates identical.

Figure 7:
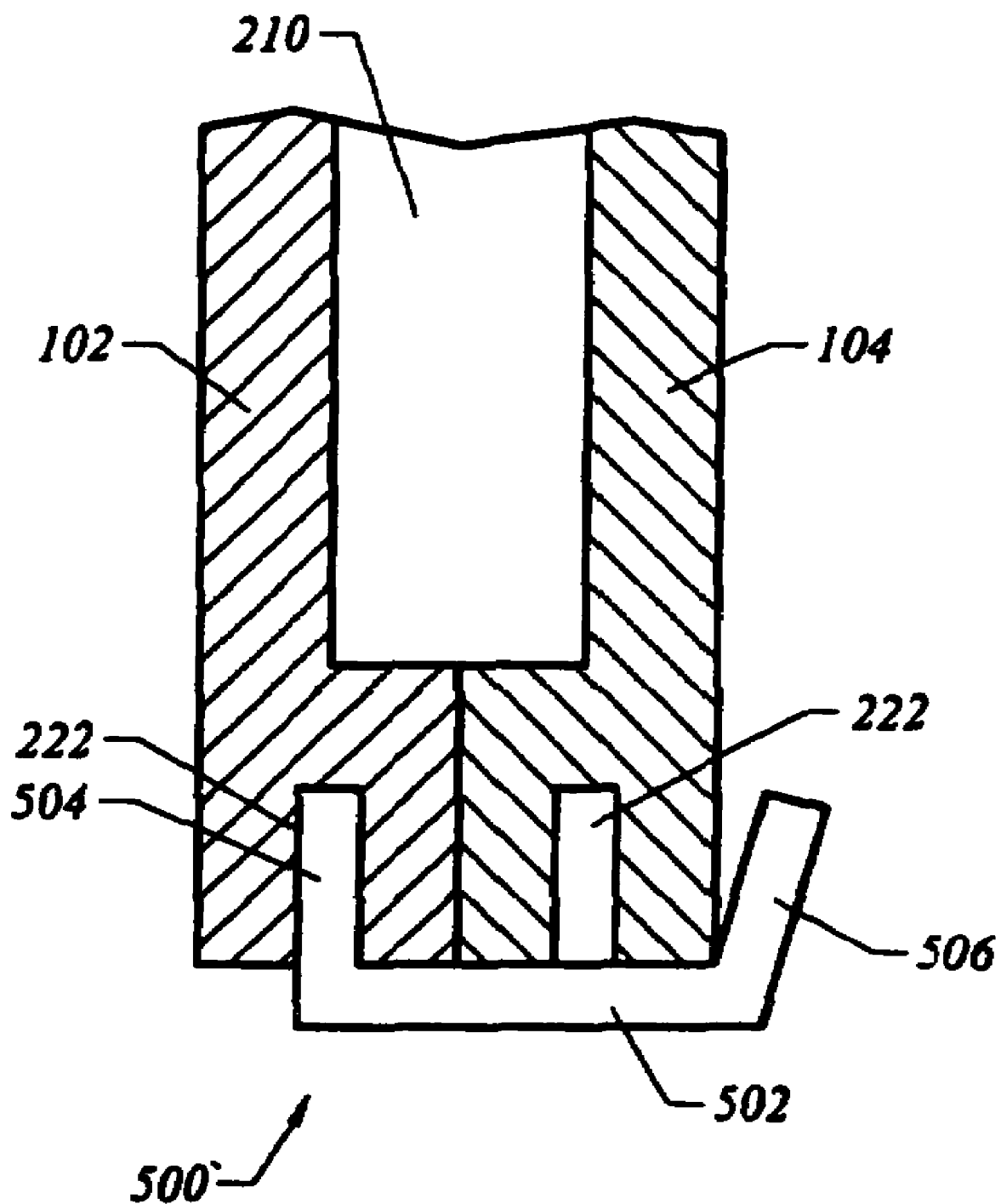
FIG. 7 is a sectional view of a portion of the apparatus of FIG. 1 and the connector of FIG. 5.

FIG. 7 is a sectional view of a portion of the apparatus of FIG. 1 and the connector of FIG. 5. As illustrated in FIG. 7, the connector 500 as provided in FIG. 5 is used to join the plates 102, 104 together at the extension region 210 having a hole 216 for a conductor wire. The tab 504 that extends from the connector at an approximate right angle is inserted into the recess 222 located at the perimeter of the first extension area 210 of the first plate 102. In this case, the other tab 506 that is not inserted into the recess does not contact the surface of the second plate 104, except for some contact at the point where this tab 506 meets the base 502 of the connector, because of the obtuse angle at which the tab 506 extends from the base 502. In other words, the tab 506 that is not inserted into a recess extends away from the side of the second plate 104. It should be appreciated that a second connector, like the connector shown in FIG. 5, is also used in the other extension region 212 having a hole 218 for a second conductor wire. Similarly the tab 504 that extends from the connector at an approximate right angle is inserted into the recess 224 located in the perimeter of the second extension region 212 of the plate 102. Again, it should be appreciated that both connectors used in the extension regions having the holes for the conductor wires may be inserted into the corresponding recesses in the second plate 104 rather than the first plate 102, or one connector may be inserted in one recess of one plate and the second connector may be inserted into the recess of the second plate. As will be discussed below, to facilitate separation of the plates, it is preferable to have the extension regions having holes for the conductor wires, as opposed to the ground wire, separate before the ground wire separates. Using the connectors 500 having a tab with an obtuse angle in these extension regions facilitates separation of the plates 102, 104 at the extension regions 210, 212 having holes 216, 218 for the conductor wires before the plates 102, 104 separate near the center 208, where the hole 220 is for the ground wire.

In operation, when the apparatus 100 is fully assembled, the connectors 400, 500 are fitted along the perimeter of the extension regions 210, 212, 214 to hold the plates 102, 104 together. Upon receiving a certain amount of tensional force upon the conductors or ground wire, the connectors 400, 500 are designed to allow the plates 102, 104 to come apart, thereby creating a physical and electrical separation of the conductors and ground wire. This controlled separation is facilitated by the design of the connectors 400, 500. The connectors 500 holding the first and second extension regions 210, 212 having holes 216, 218 for receiving conductor wires are designed to allow those extension regions 210, 212 to separate first after the tensional force exceeds a predetermined maximum load. Specifically, the applied tensional force pulling on the plates 102, 104 will cause the plates to first separate at the extension regions held together by the connectors 500 having tabs 506 that extend away from the outside surface of the plates 102, 104 at an obtuse angle. The degree to which the tab 506 extends away from the outside surface of the plates 102, 104 will determine the amount of tensional force or load required to separate the plates 102, 104. The movement of the plates 102, 104 causes the connectors 500 holding the first and second extension regions 210, 212 having holes 216, 218 for the conductor wires to bend or possibly break, thereby releasing the plates from each other at these extension regions 210, 212.

The movement or shifting of the plates 102, 104 upon the application of a tensional force is facilitated by the design of this particular connector 500. By having the non-inserted tab 506 extend out from the base 502 at an obtuse angle, a space is created between the outer surface of the plate and the non-inserted tab 506, which allows the plates 102, 104 to separate at that point or extension region compared to the extension region 214 that does not have a hole for receipt of a conductor and that utilizes a connector that fits snugly against the outer surface of the plate.

Once the connectors 500 in the perimeter of the first and second extension regions 210, 212 allow the plates 102, 104 to begin to separate in the first and second extension regions 210, 212 having holes for the receipt of conductor wires, the separation of the plates 102, 104 continues toward the third extension region 214 having no hole, thereby causing the apparatus 100 to open up at an angle. Eventually, the inserted tab 404 from the connector 400 slips out of the recess 226 in the third extension region 214, as the plates 102, 104 fall apart. As a result, the detachment of the connector 400 from the third extension region 214 having no hole completes the separation process of the plates 102, 104. It should be appreciated, however, that the connectors having tabs with an obtuse angle 500 are designed to allow the plates to separate in those corresponding extension regions first, it is possible that only one of the two connectors will break or release first rather than both. Further, even if both of these connectors do bend or break it is not necessary that they bend or break simultaneously.

Moreover, it should be appreciated that the designs of the connectors 400, 500 are not limited to the embodiments described above. Other connector designs that facilitate the holding of the plates 102, 104 may come in various shapes, sizes, and parts, such as a clip or clamp that grabs the plates 102, 104 by the outer surfaces at the perimeter. Further, when designing a connector the geometry of the body, including, for example, the geometry of its edges, needs to be taken into consideration. For example, the connector should be able to hold a pair of plates or other body design at its periphery and should be capable of allowing the pair of bodies to separate from one another. It should be appreciated that while the connector should allow the bodies to separate, it is possible that the connector may remain attached to one body or the other after separation. The connector design should also be flexible and realistic to hold and separate from plates 102, 104 of different shapes, sizes, thicknesses and surface textures.

Other design features for the connectors include a mechanism to facilitate the controlled separation of the device, such as the bending or breaking of the connectors as described above. One way of incorporating such a mechanism is to set the design around the release load, which is the point in which the tensional force has exceeded a predetermined load. In the particular embodiment of the connector 500 shown in FIG. 5, the release load design aspect may lead to a variety of choices for the angle at which the tab 506 extends from the base 502. In one embodiment, this angle is approximately 135°. The thickness of the tabs 504, 506 and the base 502 may also be designed with more or less strength to alter the point at which the plates are capable of separating near this connector.

Another design factor is the material selection for the connectors. A wide variety of materials can be used in making these connectors, including, for example, plastic, steel and graphite. The material selection for the connectors is also a factor in determining the amount of tensional force that will result in bending or breakage of the connectors and separations of the plates. For instance, when requiring a smaller release load, less rigid materials, such as a softer plastic, can be used to facilitate bending or breaking of the connector and separation of the plates. As noted above, a preferred angle is 135° with a preferred design that would allow the plates to separate upon receiving a tensional load of approximately 1000 lbs, wherein the apparatus 100 is placed within 2 feet of a transformer on a service drop line.

Figure 8A:
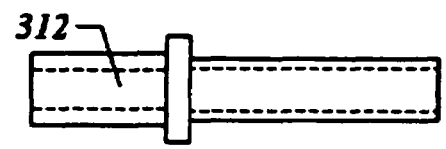
FIG. 8A is a side view of a female crimp-on connector according to one embodiment of the present invention.
Figure 8B:
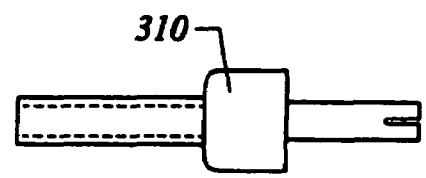
FIG. 8B is a side view of a male crimp-on connector according to one embodiment of the present invention.

FIG. 8A is a side view of a female crimp-on connector 312 according to one embodiment of the present invention, and FIG. 8B is a side view of a male crimp-on connector 310 according to one embodiment of the present invention. The female crimp-on connector 312 is configured to receive one end of an individual conductor wire and is securely held onto the end of the conductor wire by crimping. Similarly the male crimp-on connector 310 is configured to receive one end of an individual conductor wire and is securely held onto the end of the conductor wire by crimping.

The female crimp-on connector 312 can be joined to the male crimp-connector 310, forming a union of crimp-on connectors 310, 312 held together by a friction fit. The crimp-on connectors 310, 312 are inserted into the corresponding holes 216, 218 of plates 102, 104 for the conductor wires and the mating of the male and female crimp-on connectors 310, 312 facilitates the electrical connection between the corresponding pair of conductors from the opposing plates 102, 104. Thus, both crimp-on connectors 310, 312 are preferably cylindrical in geometry for an easier fitting into the holes 216, 218. It should be appreciated that any suitable geometry for the crimp-on connectors can be used, such as a hexagon, octagon, or decagon, so that the crimp-on connectors may be easily fitted into the holes. The geometry of the holes may also dictate the shape of the crimp-on connectors, such as a circular hole for a cylindrical crimp-on connector, an octagonal hole for an octagonal crimp-on connector 310, 312, and so on.

Since the crimp-on connectors 310, 312 come into contact with the conductors and the plates 102, 104, the use of non-conductive materials for the crimp-on connector is desirable from an electrical standpoint because it is important to keep the conductors electrically isolated. If a conductive material is used in the construction of the crimp-on connectors 310, 312, then the connection of the conductors to the plates 102, 104, via the union of the crimp-on connectors 310, 312, must be isolated, such as through the use of a non-conductive barrier or sleeve between the crimp-on connector and the hole. For example, a rubber grommet may be used, as will be discussed below in connection with FIG. 9. Alternatively, the plates may be made from a non-conductive material.

Given that the crimp-on connectors 310, 312 may be used outdoors in an unprotected environment, it is also desirable to use a material of construction for the crimp-on connectors 310, 312 that would withstand significant deterioration from the elements, such as UV rays or precipitation. The material used in the construction of the crimp-on connectors 310, 312 should also be sufficiently strong to remain intact upon impact on the ground when the plates 102, 104 separate, so that the crimp-on connectors 310, 312 do not require replacement.

Figure 9:
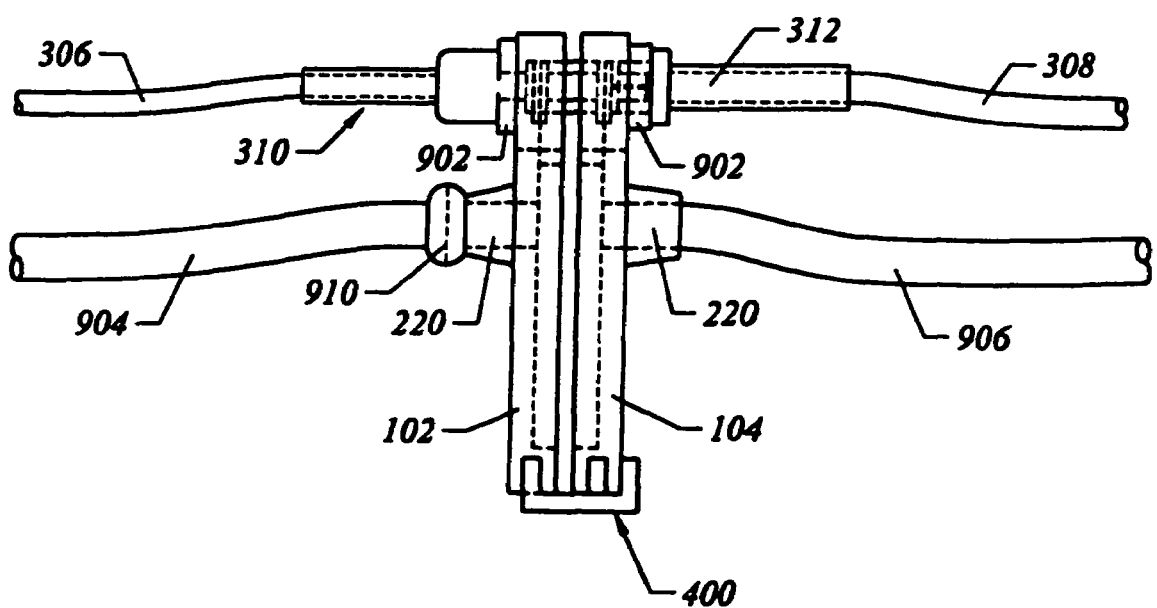
FIG. 9 is a side view of a fully-assembled apparatus according to one embodiment of the present invention.

FIG. 9 is a side view of a fully-assembled apparatus according to one embodiment of the present invention. As described earlier, the plates 102, 104 are held together by the connectors 400, 500. (The connectors 500 holding the first and second extension areas 210, 212 are not shown here.) The holes 216, 218 located in extension regions 210, 212 of the plates 102, 104 each receive one of the female crimp-on connector 312 and the male crimp-on connector 310, along with the conductors held by the crimp-on connectors 310, 312. (Only one set of conductors 306, 308 going through the crimp-on connectors 310, 312 and the plates 102, 104 is shown.) Rubber grommets 902 are positioned between the male crimp-on connector 310 and the first plate 102 and between the female crimp-on connector 312 and the second plate 104. The rubber grommets 902, which have been treated with UV inhibitors, are used to electrically isolate the crimped-on connectors 310, 312 from the plates 102, 104. The ground wire 904 is received by the third hole 220 located in the center of the first plate 102, while another ground wire 906 is received by the third hole 220 located in the center of the second plate 104. In this particular embodiment, the ground wires 904, 906 held by each plate 102, 104 do not necessarily physical contact each other, although the plates may be designed to facilitate such a physical connection. In this embodiment, however, the ground wires 904, 906 are electrically connected via the plates 102, 104 themselves, which are made from a conductive material.

In this particular embodiment, nipples, which may be connected or integral to the plates 102, 104, surround the area proximate to the third hole 220 located in the center of both of the plates 102, 104 to facilitate receipt of the ground wires 904, 906. The nipples are preferably tapered, such that the raised area adjacent to the plate 102, 104 surface is the widest and becomes gradually more narrow further from the plate 102, 104 surface. The nipples are designed so that the ground wires 904, 906 can remain relatively stable after insertion into the hole 220 without additional securing. However, the ground wires 904, 906 can be further secured onto the surface of the plates 102, 104 by any means known by one skilled in the art, for example, by using an eye-bolt 910 on the surface of either plate 102, 104.

Figure 10:
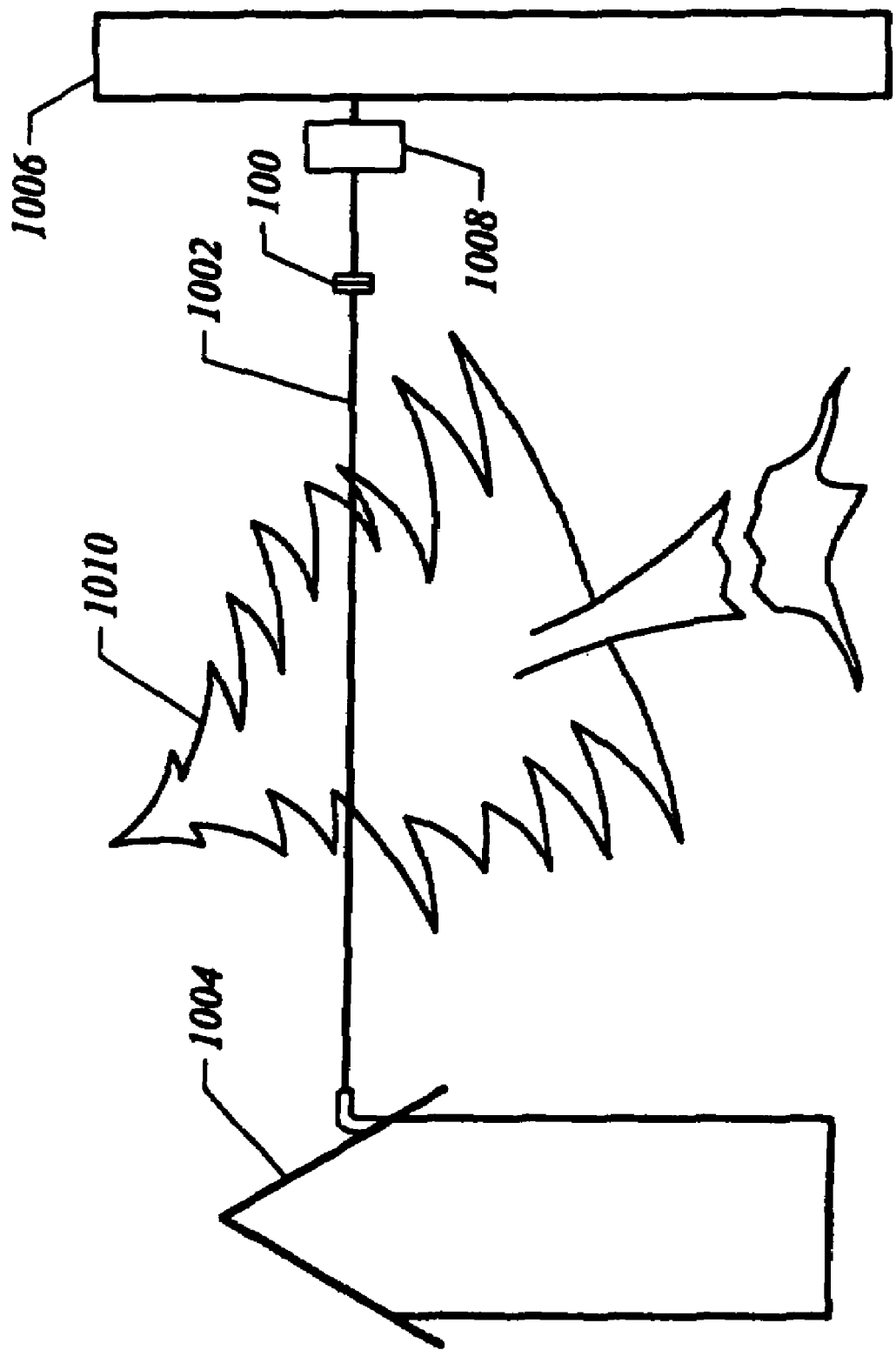
FIG. 10 is a diagram illustrating the use of one embodiment of the present invention.

FIG. 10 is a diagram illustrating the use of one embodiment of the present invention. The fully assembled apparatus 100 is positioned along a service drop wire 1002 comprising conductors and ground wires (not shown individually) that extends from a utility pole 1006 to a building 1004. Disposed between the residence building 1004 and the utility pole 1006 along the service wire 1002 are a transformer 1008 and the apparatus 100. As illustrated the apparatus 100 is positioned closer to the transformer 1008 than the building 1004. Preferably, the apparatus 100 is placed within 2 feet of the transformer. As such, a shorter length 1012 of the service drop wire 1002 extends between the transformer 1008 and the apparatus 100, and a longer length 1014 of the service drop wire 1002 extends between the apparatus 100 and the building 1004. However, the apparatus 100 could be placed closer to the building 1004 or in any position along the service drop wire 1002.

Upon receiving a tensional force on the service drop line 1002, such as one from a fallen tree 1010, the apparatus 100 physically and electrically separates each of the two conductors from the corresponding pair of conductors extending from the transformer 1008 and physically and electrically separates the ground wire from the corresponding ground wire extending from the transformer 1008. As a result of the separation of the conductor and ground wires from the apparatus, one portion of the service wire 1002 extending from the transformer 1008 drops to the ground, while the other portion of the service wire 1002 extending from the building 1004 drops to the ground in a separate location. The dropping of these service wire portions prevents the tensional force from the fallen tree 1010 severely damaging the service hardware attached to the building 1004 and the utility pole 1006, including the transformer 1008. The prevention of damage to the service hardware saves money for the utility company, while also making the situation safer for residents and the utility company service crew since the dropped service wire would be energized.

In addition, with the separation of the conductor and ground wires, the apparatus 100 falls onto the ground, although it should be appreciated that depending upon the relative lengths of the portions of the service drop wire 1012, 1014 to the height from the ground, it is possible that the separated plates may not actually hit the ground. The rugged design of the apparatus 100 allows the apparatus to be re-used again on the same or different service wire. To re-use the apparatus, the utility company service crew would simply position the plates 102, 104 back together and attach the connectors if in re-usable condition or simply attach new connectors.

In a multi-service arrangement, in which power is distributed along the same transformer for at least two or more customers, the conductors and ground wires that service each customer are in close proximity to the conductors and ground wires that service other customers. When a tensional force is placed upon any of the conductors or ground wires in a multi-service arrangement, such as when a tree limb collapses onto one of the sets of conductors or ground wire extending to one customer, in addition to the concerns relating to building and service hardware damages as noted before, another concern emerges: how to safely and effectively disengage the stressed conductor or ground wire without disrupting the other customers' service.

Figure 11:
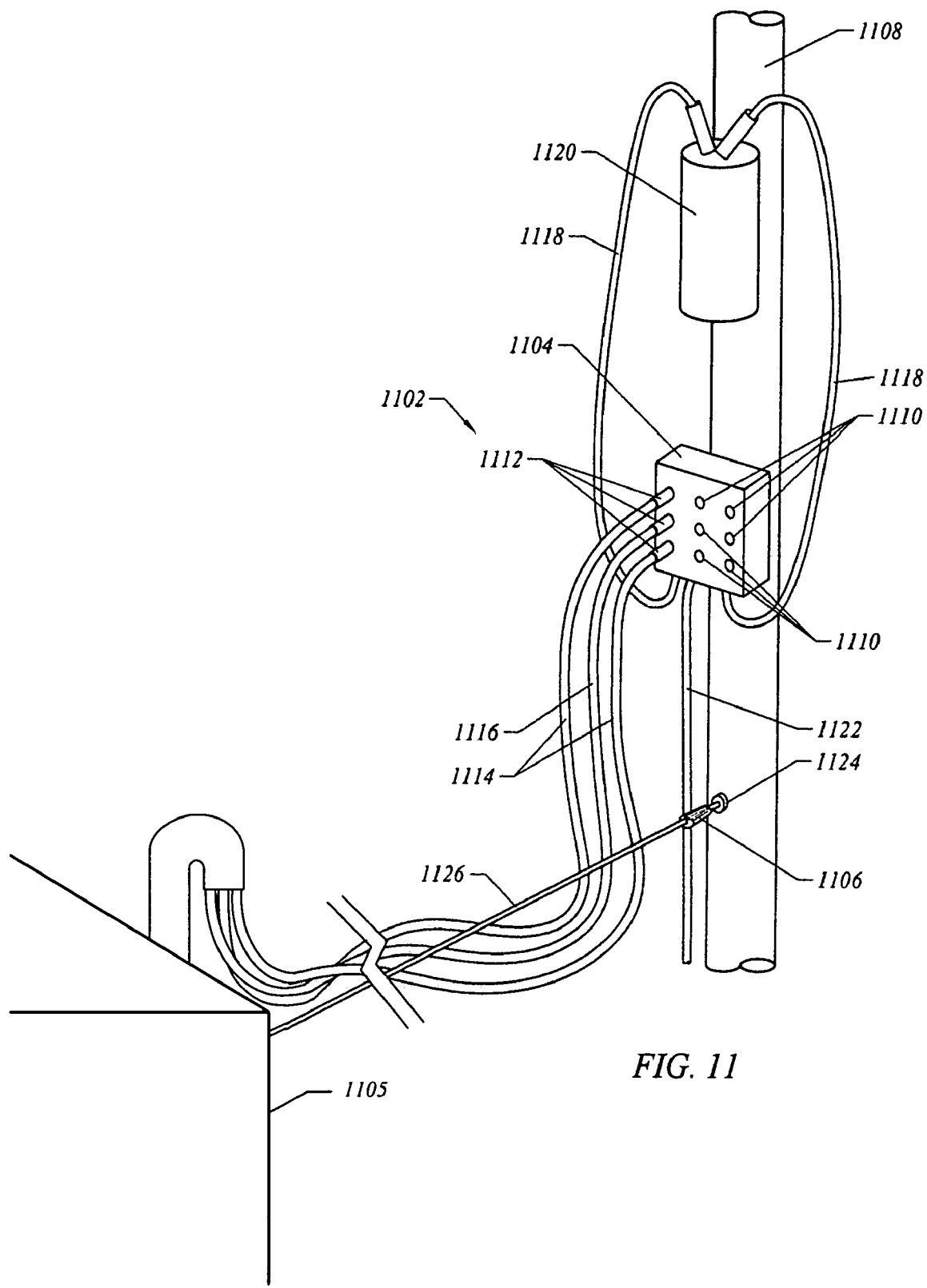
FIG. 11 illustrates a schematic diagram of one embodiment of the present invention for a multi-service arrangement.

FIG. 11 illustrates a schematic diagram of one embodiment of the present invention for a multi-service arrangement. This embodiment addresses the new concern raised in a multi-service arrangement of how to safely and effectively disengage a stressed conductor or ground wire without disrupting power for other customers while also addressing the need to release a stressed conductor or ground wire before structural or hardware damage occurs. The apparatus 1102 comprises a switchboard box 1104 and a mechanical breakaway device 1106, in which both the switchboard box 1104 and mechanical breakaway device 1106 are attached to a utility pole 1108. A plurality of conductors and ground wires run through the holes 1110 on the switchboard box 1104. For example, each customer's service connection may comprise a pair of conductors and one ground wire that are fitted into crimp-on connectors 1112, which are inserted into the holes 1110 on the switchboard box 1104, preferably in a single column of holes 1110 for each customer. FIG. 11 demonstrates the service connection for one customer by using two conductors 1114 and a ground wire 1116 attached to the switchboard box 1104, with the remaining holes 1110 on the switchboard box 1104 left open for the later installation of service for other customers. Other conductors 1118 are connected between the switchboard box 1104 to a transformer 1120 on the same utility pole 1108 to provide power from the transformer 1120 to each service connection. Another ground wire 1122 is connected between the switchboard box 1104 and the actual ground surface at the bottom of the utility pole 1108. Generally, the mechanical breakaway device 1106 is attached to the utility pole 1108 somewhere below the switchboard box 1104 and can be secured by any means known to one of skill in the art, such as using an eyebolt 1124. The mechanical breakaway device 1106 receives a ground wire, in which this ground wire serves as a messenger wire 1126 that provides structural support for the service drop wires (conductors and individual ground wires) between the utility pole 1108 and their end points at each customer's location 1105.

In general operation, and as will be discussed in more detail below, electrical service to each customer is achieved by connecting the corresponding conductors and ground wires of each customer to the switchboard box 1104 and by connecting conductors from the transformer 1120 to the switchboard box 1104, thereby electrically connecting power from the overhead lines to the service drop conductors. The corresponding conductors and ground wire for each customer that are connected to the switchboard box 1104 act collectively as the service drop line for that customer. The ground wire extending from the mechanical breakaway device 1106, also known as the messenger wire 1126, supports the service drop line coming out of the switchboard box 1104 to the customer's building. Thus, the messenger wire 1126 is placed below the conductors and ground wires from the switchboard box 1104 for mechanical support. In this multi-service arrangement, each customer's service drop line is supported by its own messenger wire 1126, so there is generally a plurality of messenger wires 1126 attached to the utility pole 1108 via separate mechanical breakaway devices 1106. Upon the application of a predetermined amount of tensional force upon, for example, the power line for a particular customer, this embodiment of the present invention is designed so that the mechanical breakaway device 1106 detaches from the utility pole 1108 first, thereby releasing the messenger wire 1126 first, which is followed by the detachment of the stressed power line from the switchboard box 1104. In other words, once the messenger wire 1126 detaches, the supporting mechanism for the power lines is removed, so that the power line drops shortly after the messenger wire 1126 has been released, thereby avoiding any transfer of tension to the transformer 1120, utility pole 1108 or the customer's building 1105. In addition the service drop line that falls would be electrically disconnected and, therefore, not electrically charged. It should be appreciated that should the tensional stress on the power line for a particular customer also affect other service drop lines, those power lines would be disconnected as well.

Figure 12:
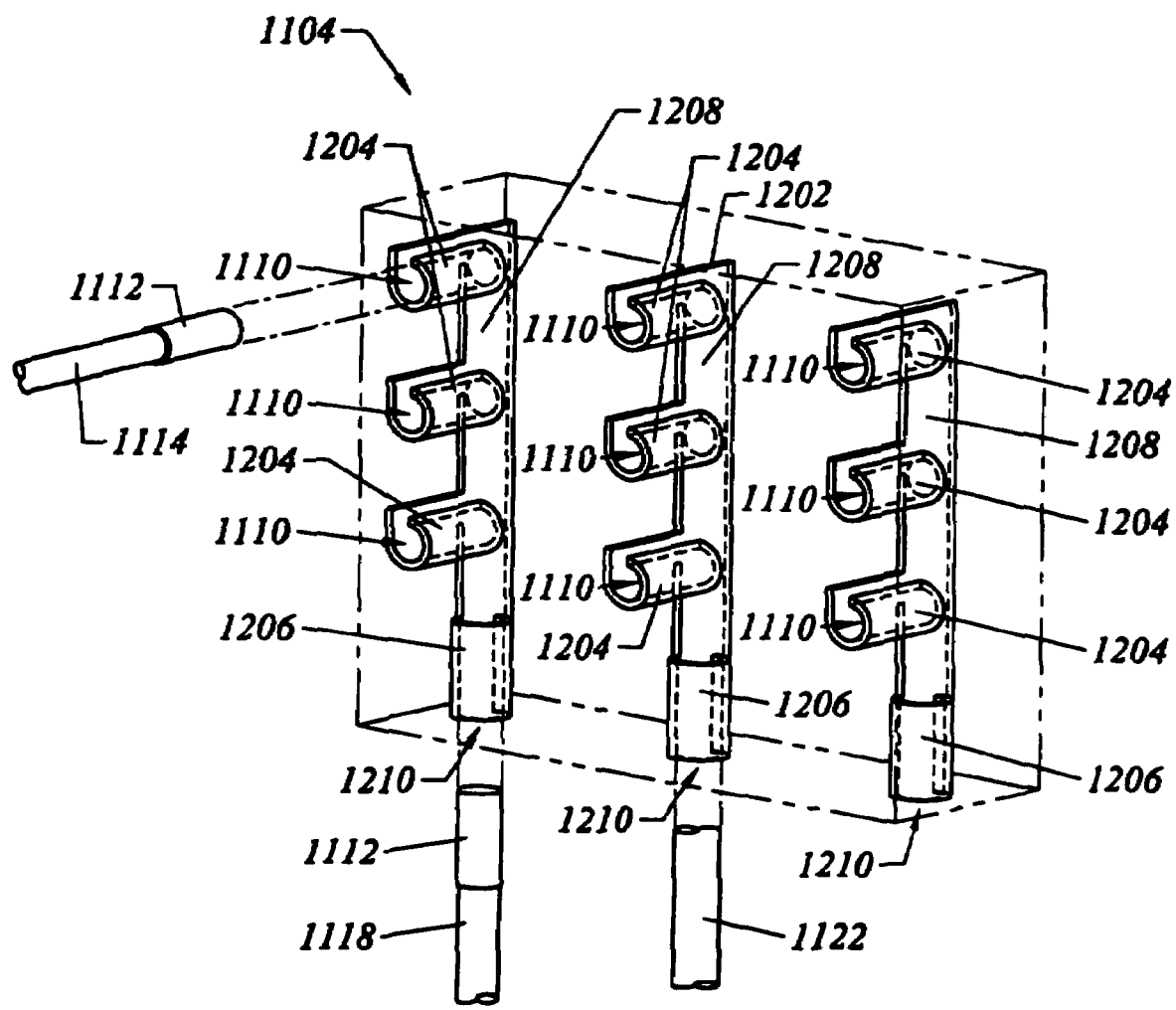
FIG. 12 is a perspective view of a switchboard box of FIG. 11.

FIG. 12 is a perspective view of the switchboard box of FIG. 11. The switchboard box 1104 is any type of enclosure or housing that is capable of housing the connections made between the conductors from the transformer 1120 and the service drop wires. The switchboard box 1104 comprises a plurality of service drop connectors 1202 disposed inside of the switchboard box 1104. The service drop connectors 1202 each comprise a flat body 1208 having a plurality of connecting portions 1204 and a single end connector 1206. A predetermined number of connecting portions 1204 are arranged in a column along the flat body 1208 and the single end connector 1206 is attached at one end of the flat body 1208. Each of the connection portions 1204 is configured as a tube that is open along its length. The connecting portions 1204 are aligned with the holes 1110 on the outer surface of the switchboard box 1104 so that crimp-on connectors 1112 with conductors 1114 or ground wires may be inserted through the holes 1110 and into the connecting portions 1204. Similarly the end connector 1206 is aligned with an outlet opening 1210 located at the bottom surface of the switchboard box 1104 so that either crimp-on connectors 1112 can be inserted or individual conductors or ground wires may be fitted into the end connector 1206.

The material for the service drop connectors 1202 can be any suitable conductive material. For example, aluminum, copper or any conductive metal, such as conductive polymers, can be used to fabricate the service drop connectors 1202. The service drop connectors 1202 are situated within in switchbox 1104 in an insulating material, such as rubber or polyethylene, so that the conductors and ground wires for each customer service connection remain electrically isolated from each other.

It should be appreciated that the service drop connectors 1202 do not have to reside within the switchboard box 1104. For example, the service drop connectors 1202 can function as intended, i.e., holding connectors and wires while acting as a conductor, outside of the switchboard box 1104, but it would be subject to environmental elements. Hence, an exposed set service drop connectors would need to be designed to withstand the rigors of the environment, such as wind, sun and rain exposure. If using a conductive metal to make the service drop connectors 1202, then the insulating material enveloping the service drop connectors 1202 would act to avoid oxidation of the metal.

Similarly, when implementing this embodiment of the present invention with a switchboard box 1104, the switchboard box 1104 design and selection should be such that it can withstand the outdoor elements. The switchboard box 1104 is designed to protect the service drop connectors 1202 from the outdoor elements. For example, the switchboard box 1104 should be made of a material that is strong enough to withstand the elements, such as plastic or metal. The holes 1110 and openings 1210 on the surfaces of the switchboard box 1104 should approximately be the same size as the openings of the connecting portions 1204 and the single end connectors 1206. Likewise, the geometry of the holes 1110 and openings 1210 on the surfaces of the switchboard box 1104 should match the geometry of the openings of the connecting portions 1204 and the single end connectors 1206, such as circular holes with circular tubes or octagonal holes with octagonal tubes, etc. By having the same size and geometry for these items, it not only facilitates easier insertion of the crimp-on connectors 1112, but it also minimizes gaps between the internal structure 1112 and the switchboard box 1104 holes 1110 and openings 1210, in which air and precipitation could leak into such gaps and damage the service drop connectors 1202.

It should also be appreciated that a switchboard box 1104 is not necessary to protect the service drop connectors 1202 from the outdoor elements. Any suitable protective covering design can be used. The protective covering can be of any suitable geometry with any suitable number of surfaces. For instance, a protective covering can be extended over the top, sides and bottom of the service drop connectors, while leaving the front of the service connectors uncovered and having outlet openings at the bottom of the protective covering. The protective covering should be constructed with a durable material that can withstand the outdoor elements. When using a switchboard box or protective covering, it is preferable to have a back surface behind the service drop connectors so that the switchboard box or protective covering can be readily mounted on the utility pole.

Regardless of which embodiment of the present invention is used, the service drop connectors 1202 in the switchboard box 1104 should be situated near the transformer 1120 so that conductors 1118 leading out of the transformer 1120 can be readily inserted into the service drop connectors 1202 within the switchboard box 1104. The switchboard box 1104 can be attached to the utility pole 1108 by using any means known to one of skill in the art, such as using standard pole hardware or connectors.

Figure 13:
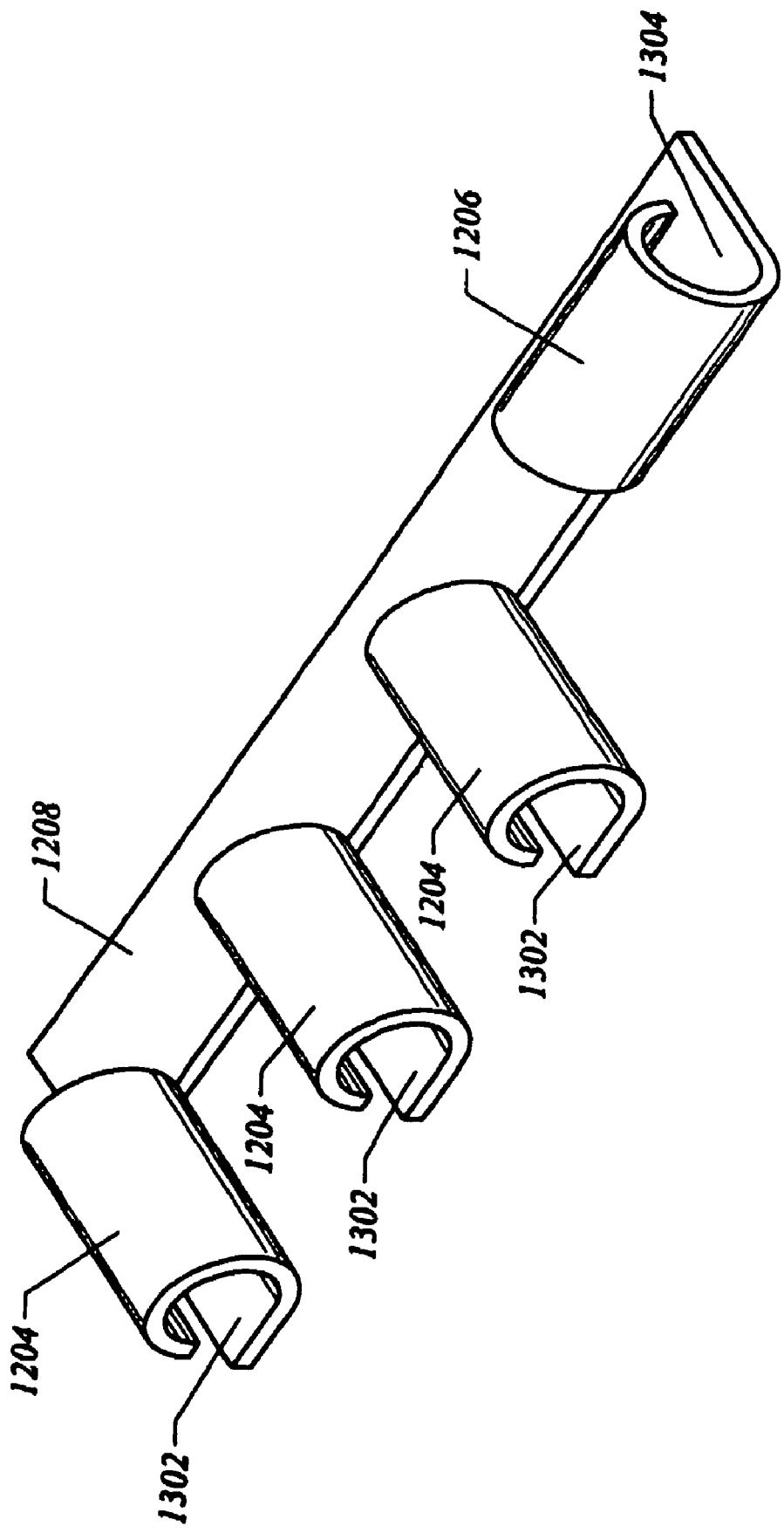
FIG. 13 provides a perspective view of a single service drop connector of FIG. 11.

FIG. 13 provides a perspective view of a single service drop connector FIG. 12. In operation, there would be a plurality of such service drop connector 1202 residing within the switchboard box 1104. The service drop connector 1202 comprises a flat body 1208 having a plurality of connecting portions 1204 and a single end connector 1206. The connecting portions 1204 have a relatively flat side 1302 that is used to attach the connecting portions 1204 to the flat body 1208. This relatively flat side 1302 of the connecting portions 1204, facilitates a more elastic, spring-like effect in the tubular members 1204 so that the connecting portions 1204 expand and contract somewhat when the crimp-on connectors 1112 are inserted or pulled out of the connecting portions 1204, as well as when holding the crimp-on connectors 1112 in place. Similarly, the single end connector 1206 is also designed with a relatively flat side 1304, in which the relatively flat side 1304 is used to attach the single end connector 1206 to the flat body 1208. Similarly to the connecting portions 1204, the relatively flat side 1304 of the single end connector 1206 facilitates a more elastic, spring-like effect in the single end connector 1206 so that the single end connector 1206 expands and contracts somewhat when a crimp-on connector 1112, conductor 1118 or ground wire 1122 is inserted or pulled out of the single end connector 1206, as well as when holding the crimp-on connectors 1112, conductor 1118 or ground wire 1122 in place. Additionally, the expansion and contraction characteristic of the connecting portions 1204 and single end connector 1206 also facilitate easier insertion and removal of crimp-on connectors 1112, conductors 1118 or ground wires 1122.

It should be appreciated that the connecting portions 1204 and single end connector 1206 do not require relatively flat sides 1302, 1304 and can be any suitable geometry or configuration, as long as it facilitates the connection of conductors, ground wires or wire connector, such as the crimp-on connectors 1122. For example, connecting portions 1204 and single end connector 1206 may be tailored to the shape of the wire or crimp-on connectors being inserted. For example, the connecting portions may be octagonal in shape to receive a crimp-on connector that is octagonal in shape. The geometry and configuration of the connecting portions 1204 and single end connector 1206 should also take into consideration the tightness of the conductor, ground wire or wire connector fit. The tightness of such a fit is a factor in the design of the present invention so that the stressed conductor or ground wire may drop at the designated tension load. When using the crimp-on connectors 1122 in this particular embodiment of the present invention with the connecting portions 1204 having a relatively flat side 1302 attached to the flat member 1208, it is desirable to have a friction fit between the crimp-on connectors 1112 and the connecting portions 1204 to facilitate a quicker release of the stressed conductor or ground wire after the messenger wire 1126 is detached. The separation of the stressed conductor or ground wire will be discussed in greater detail later.

Figure 14:
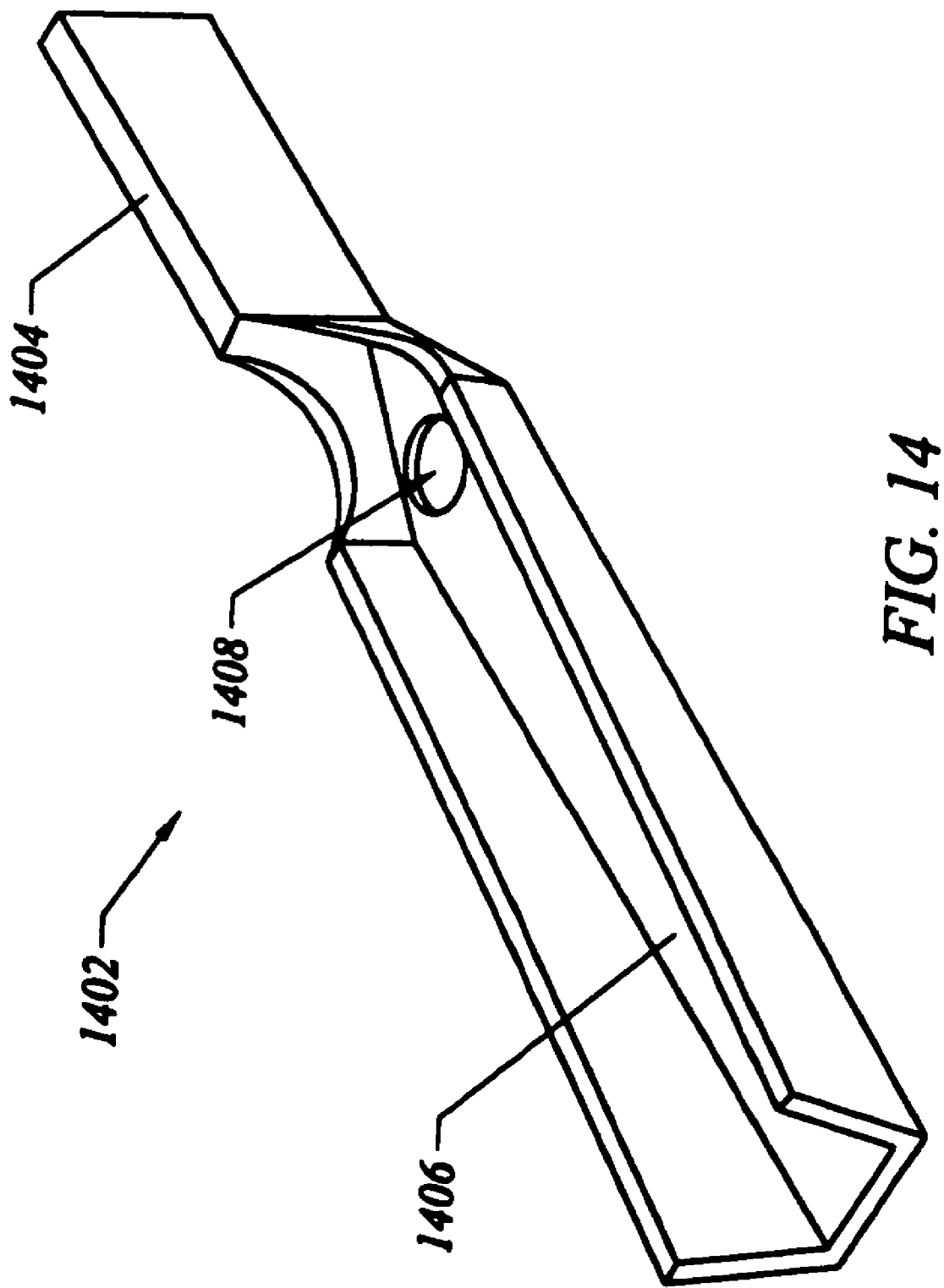
FIG. 14 provides a perspective view of a portion of the mechanical breakaway device of FIG. 11.

FIG. 14 provides a perspective view of a portion of the mechanical breakaway device of FIG. 11. In this particular embodiment, a breaking member 1402 is the top component of the mechanical breakaway device 1106 and is a wedge clamp-like device. The breaking member 1402 has two distinct portions. The first portion 1404 is a thin block used to facilitate the attachment of the mechanical breakaway device 1106 to the utility pole 1108, and it is located at one end of the breaking member 1402. For example, the first portion 1404 can be inserted into a hole on the utility pole 1108 or secured by fitting an eyebolt 1124 through a hole (not shown) in the first portion 1404 of the breaking member 1402. The second portion 1406 of the breaking member 1402 resembles a trough, but the bottom and side walls of the second portion 1406 are tapered and are closer together near the first portion 1404 of the breaking member 1402. A hole 1408 is located in the area near the union of the two portions 1404, 1406. The hole 1408 is designed to weaken the breaking member 1402, so that the breaking member 1402 breaks upon the application of excessive tension on the messenger wire 1126. In other words, the hole serves as an initiation area for breaking to occur. Therefore, the design of this hole, which may take any shape or size, is critical to the load at which the breaking member 1402 will actually break. A larger hole will allow the breaking member 1402 to break more easily or upon application of a lower tensional force than a smaller hole. The operation of the breaking member 1402 as used in conjunction with the overall mechanical breakaway device 1106 is discussed below in connection with FIGS. 15-17.

Figure 15:
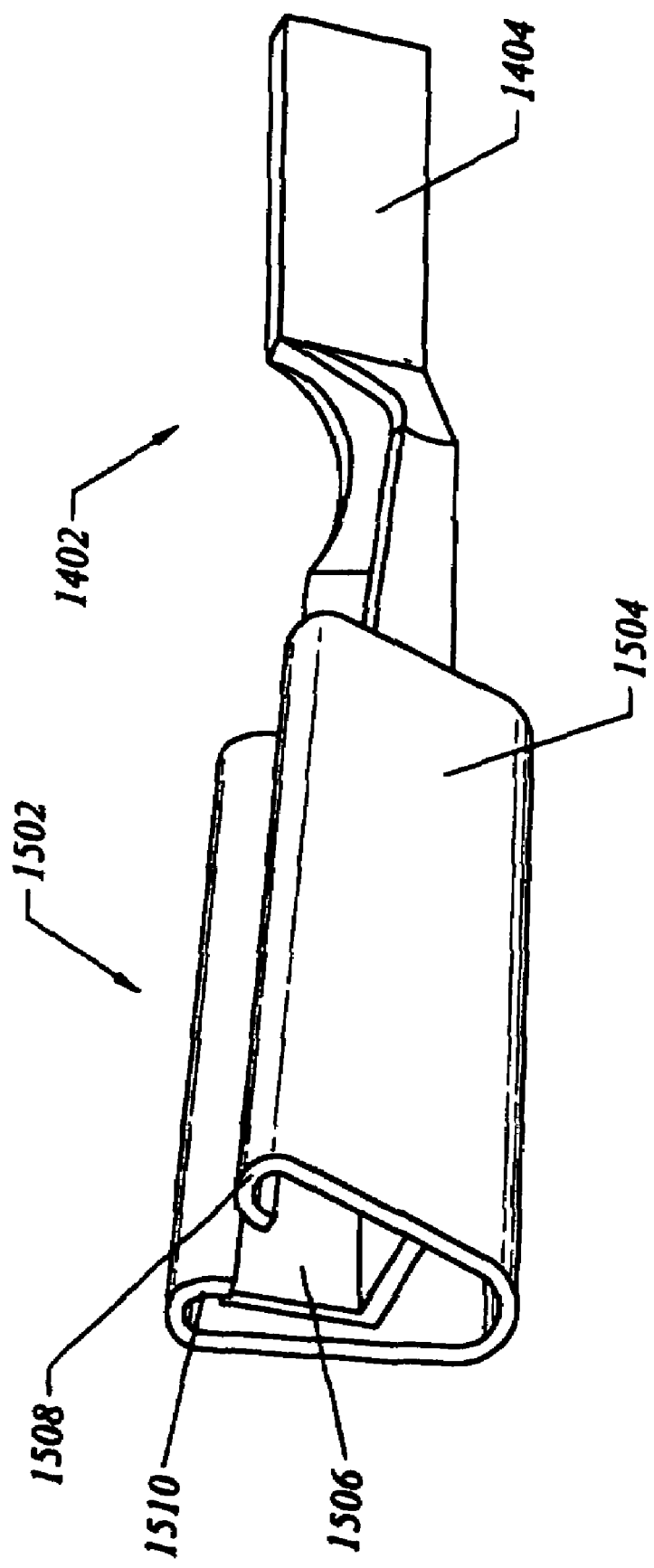
FIG. 15 is a perspective view of the mechanical breakaway device of FIG. 11.

FIG. 15 is a perspective view of the mechanical breakaway device of FIG. 11. In addition to the breaking member 1402 described above, the mechanical breakaway device 1106 also comprises a gripping member 1502. In this particular embodiment, the gripping member 1502 is U- or V-shaped, with side walls 1504 that extend over the top of the side walls 1506 of the breaking member 1402. The top edges 1508 of the side walls 1504 of the gripping member 1502 should contact the top edges 1510 of the side walls 1506 of the breaking member 1402. The top edges 1508 of the side walls 1504 of the gripping member 1502 should be somewhat curved to facilitate the gripping of the top edges 1510 of the side walls 1506 of the breaking member 1402. The top edges 1508 of the side walls 1504 of the gripping member 1502 should be such that they facilitate sliding of the gripping member 1502 across the top edges 1510 of the side walls 1506 of the breaking member 1402.

Figure 16:
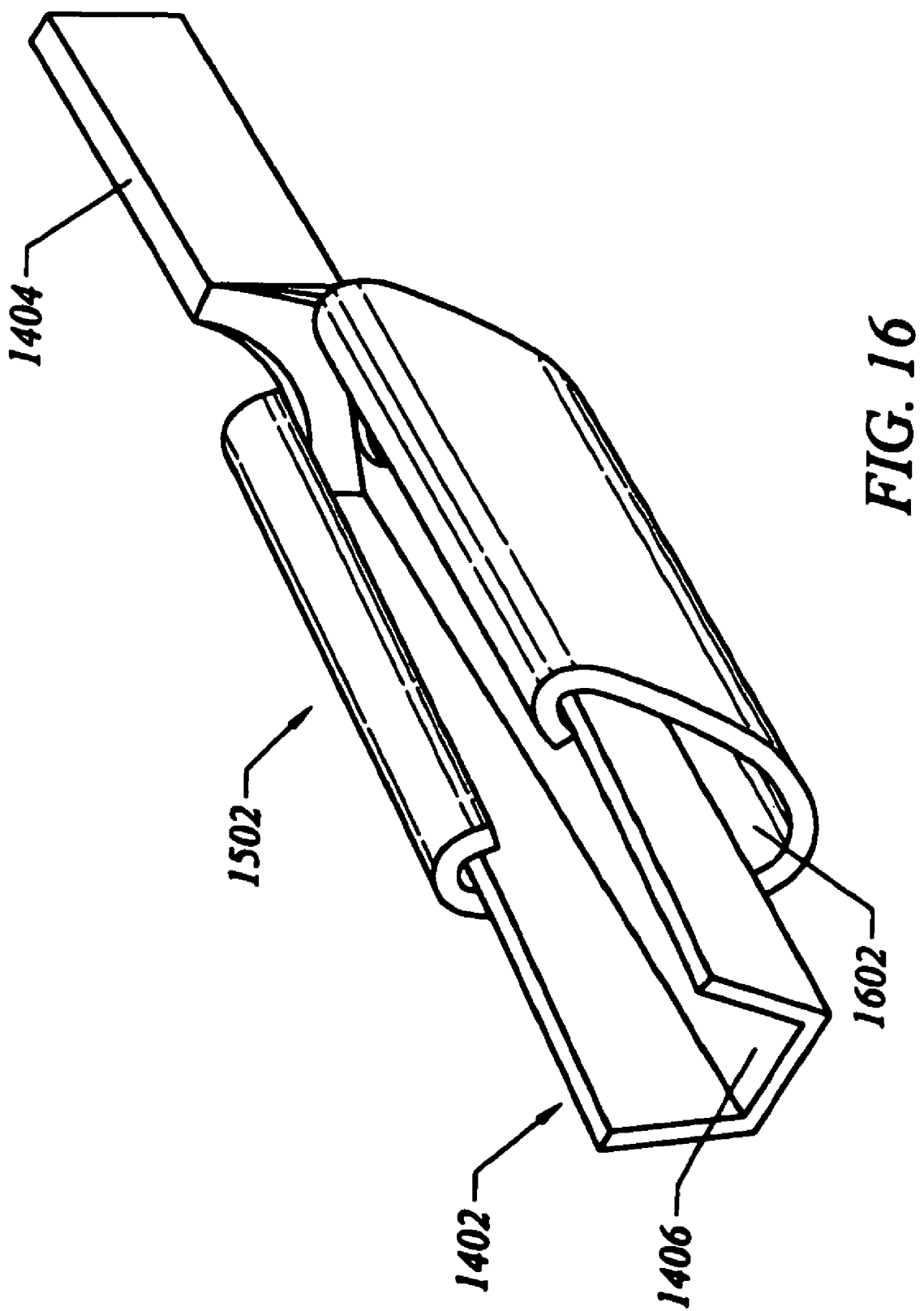
FIG. 16 is another perspective view of the mechanical breakaway device of FIG. 11.

FIG. 16 is another perspective view of the mechanical breakaway device of FIG. 11. In this view, the gripping member 1502 is positioned closer to the first portion 1404 of the breaking member 1402. In this particular embodiment, when the gripping member 1502 is positioned closer to the first portion 1404 of the breaking member 1402, there should be an opening formed at the mouth 1602 of the gripping member 1402 that is large enough for the insertion of the messenger wire 1126 (not shown). As the gripping member 1502 is positioned closer to the first portion 1404 of the breaking member 1402, the opening at the mouth of the gripping member 1502 becomes larger.

Figure 17:
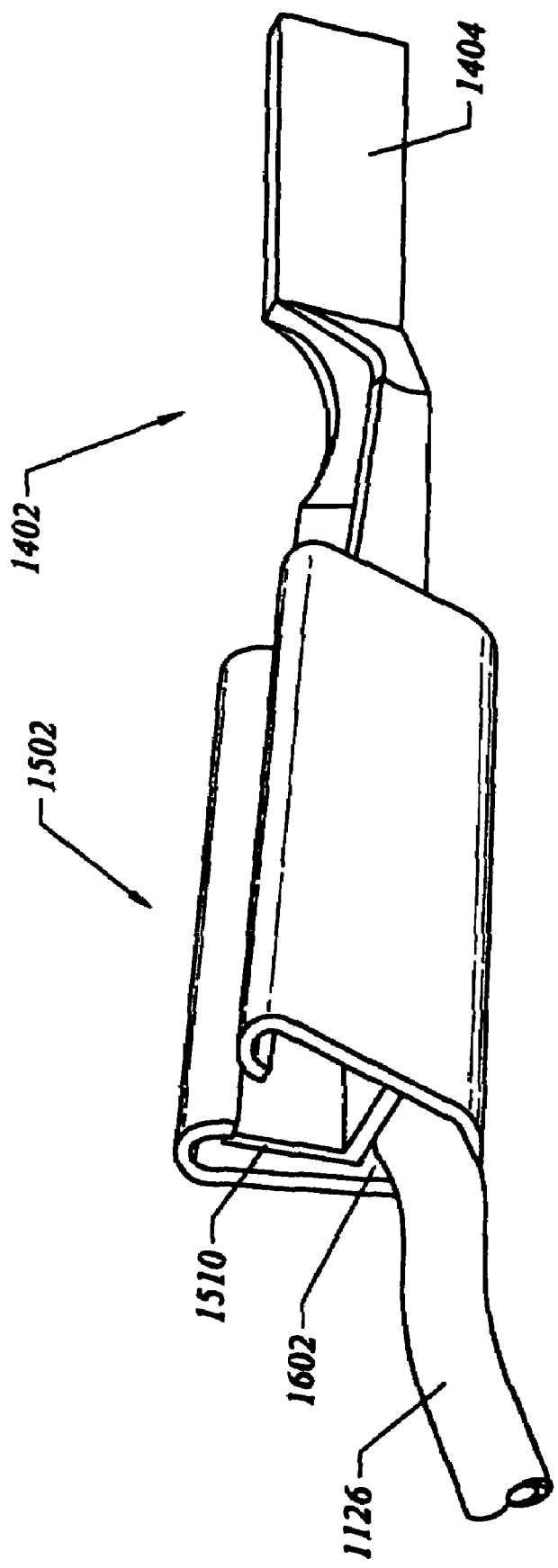
FIG. 17 provides yet another perspective view of the mechanical breakaway device of FIG. 11.

FIG. 17 provides yet another perspective view of the mechanical breakaway device of FIG. 11. In this view, the mechanical breakaway device 1106 is shown with the messenger wire 1126. In this particular embodiment, when the gripping member 1502 is positioned at the end of the second portion 1406 of the breaking member 1402, the opening formed at the mouth 1602 of the gripping member 1502 is more narrow than the opening formed when the gripping member 1502 was closer to the first portion 1404 of the breaking member 1402, so that the narrowed opening holds the messenger wire 1126 firmly in place. As the gripping member 1502 is positioned closer to the end of the second portion 1406 of the breaking member 1402, the opening at the mouth of the gripping member 1502 becomes narrower, eventually becoming too narrow to insert the messenger wire 1126. Therefore, the messenger wire 1126 has to be inserted first when the gripping member 1502 is positioned closer to the first portion 1404 of the breaking member 1402, and the gripping member 1502 is then positioned back to the end of the second portion 1406 of the breaking member 1402 to form a firm hold over the messenger wire 1126.

It should be appreciated that the breaking member can come in any suitable shape or form, as long as there is a portion of the breaking member that can be attached to a utility pole and a portion to facilitate the holding of a messenger wire. The portion of the breaking member that is attached to the utility pole should be designed so that the messenger wire in the mechanical breakaway device can hang relatively freely so that it can sway up and down or side-to-side when the wind blows to allow some freedom of movement for the messenger wire. The portion of the breaking member that facilitates the holding of the messenger wire should be designed with features that allow the gripping member to cling onto the surface of the breaking member. Further to the embodiment described before, the top edges of the breaking member's side walls, for example, can have grooves, channels, slots, or notches that allow the top edges of the gripping member's 1502 side walls to fit into the breaking member more snugly.

Since the breaking member 1402 is designed to break, the material selection also plays a role in the breaking process. The materials used in fabricating the breaking member 1402 should be sufficiently durable to withstand the outdoor elements but yet soft or flexible enough to break under the application of a predetermined tension load. For example, aluminum and plastic are suitable materials. Alternatively, higher strength materials may be used to require a higher tensional load before the breaking member actually fails. Another factor in breaking the breaking member 1402 is the thickness of the material, in which a thinner material favors quicker breaking at lower tensional loads and a thicker material favors slower breaking at higher tensional loads.

Besides material selection and thickness, the hole 1408 on the breaking member's 1402 surface plays a role in the breaking process. The size and shape of the hole 1408 on the breaking member 1402 varies according to the predetermined tension load requirement. For instance, when the predetermined tension load is set on the lower end, the hole should be larger and/or more pointed to facilitate quicker breaking of the mechanical breakaway device 1106. To facilitate quicker breaking at a lower tension load, the breaking member 1402 can also be perforated with a plurality of holes of the same shape and size or varying shapes and sizes. The plurality of holes can be arranged in any manner, such as a straight line or a zigzag pattern. As mentioned earlier, the hole 1408 serves an initiation area for breaking, so alternatively the initiation area for breaking can be any shape or form, such as a partial cut, indentation, or notch on the surface of the breaking member 1402. The depth and size of the partial cut, indentation, notch is based on the predetermined tension load requirement. A longer and deeper partial cut, indentation, or notch facilitates quicker breaking.

It should also be appreciated that the gripping member can be in any suitable shape or form, as long as it is designed to hold the messenger wire 1126 in place with the breaking member 1402. For example, the gripping member can be U-shaped in a box-type or rectangular manner. However, if the gripping member is to be re-used after the mechanical breakaway device 1106 breaks apart, the design of the gripping member should also reflect that aspect by, for example, implementing a more rounded design to survive the impact of the fall. The gripping member can be optionally designed to slide across the top edges of the breaking member to facilitate the opening size of the gripping member for the insertion and holding of the messenger wire 1126. The side walls of the gripping member can be somewhat flexible so that the gripping member just clamps the messenger wire 1126 in place against the breaking member 1402 by pulling on the gripping member's side walls a little to fit onto the breaking member 1402. Alternatively, the gripping member can be attached to the breaking member 1402 via a hinge so that the mechanical breakaway device 1106 resembles more of a clamp to hold the messenger wire 1126 in place.

Since the mechanical breakaway device 1106 is placed outdoors, the material selection for the gripping member should be durable so that it can withstand the elements of the outdoors. Further, given that the mechanical breakaway device 1106 is designed to break when the predetermined tensional load has been met or exceeded, the material selection for the gripping member 1502 should reflect that possibility. The material for fabricating the gripping member 1502 should also withstand the impact of falling onto the ground when the mechanical breakaway device 1106 breaks via the breaking member 1402. By withstanding the impact from falling, the gripping member 1502 can be re-used when attached to another breaking member 1402.

In operation, the apparatus 1102 is generally placed below the transformer 1120, in which the switchboard box 1104 is disposed between the transformer 1120 and the mechanical breakaway device 1106, so that the customer's service drop line from the switchboard box 1104 is positioned above the messenger wire 1126 from the mechanical breakaway device 1106. Upon receiving the application of a tensional force on at least one customer's service drop line, such as from a fallen tree, the apparatus 1102 physically and electrically separates each of the stressed conductors and ground wire by first releasing the corresponding messenger wire 1126 followed by the affected customer's service drop line or wires. In effect, once a predetermined load on the messenger wire 1126 is reached, which in one embodiment is approximately 1000 lbs., the breakaway device 1106 fails thereby allowing the messenger wire to fall from the utility pole 1108. In addition, the service drop lines, which may include more than one, will also simply pull from the respective service drop wire connectors 1204 inside of the switchbox 1104 and also fall to the ground.

The dropping of these service wire portions prevents the tensional force from severely damaging the service hardware attached to the building and the utility pole 1108, including the transformer 1120, without interrupting service for other customers having service drop wires that were not stressed. The prevention of damage to the service hardware saves money for the utility company, while also making the situation safer for residents and the utility company service crew since the dropped service wire would be energized.

In addition, with the separation of the messenger wire 1126, conductors and ground wire, one portion of the apparatus 1102, specifically the mechanical breakaway device 1106, may also drop to the ground after the breaking member 1402 breaks. When the mechanical breakaway device 1106 drops to the ground, the tensional force on the messenger wire must have been great enough to have ruptured the first portion 1404 of the breaking member 1402 that is attached to the utility pole 1108. It is also possible that the messenger wire 1126 is dropped without the mechanical breakaway device 1106 falling onto the ground. In such cases, the tensional force on the messenger wire 1126 only breaks the second portion 1406 of the breaking member 1402 that facilitates the holding of the messenger wire 1126, so that the broken mechanical breakaway device 1106 is still attached to the utility pole 1108. Regardless of whether the mechanical breakaway device 1106 falls or not, the utility service crew will need to replace the breaking member 1402 when they re-connect the messenger wire 1126.

While the foregoing description and drawings represent various embodiments of the present invention, it should be appreciated that the foregoing description should not be deemed limiting since additions, variations, modification and substitutions may be made without departing from the spirit and scope of the present invention. It will be clear to one of skill in the art that the present invention may be embodied in other forms, structures, arrangements, proportions and using other elements, materials and components. For example, although the apparatus is described in connection with the use of two conductors and one ground wire, the apparatus can be adapted for use with more or less wires. Further, although the invention has been described in terms of flat plates, other geometries may be used. Further, in connection with the multi-service drop apparatus, although the apparatus is described in connection with the use of two conductors and one ground wire for one customer's service drop line, the apparatus can be adapted for use with more or less wires per service drop. Further, although the invention has been described in terms of a switchboard box and a mechanical breakaway device, other configurations of these devices may be used as long as they perform the same respective functions. The present disclosed embodiments are, therefore, to be considered in all respects as illustrative and not restrictive, the scope of the invention being indicated by the appended claims and not limited to the foregoing description.

What is claimed is:

1. A method for electrically and mechanically disconnecting a pair of suspended conductors and a suspended ground wire upon the application of a tensional force on at least one of the conductors or the ground wire, comprising:

receiving a tensional force on at least one of a first conductor, a second conductor, or a corresponding first ground wire; wherein each of said first and said second conductors and said first ground wire is suspended; wherein a first end of said first conductor, a first end of said second conductor, and a first end of said first ground wire are each connected to a predetermined portion of a body, said body configured to electrically connect said first conductor to a third conductor, said second conductor to a fourth conductor, and said first ground wire to a second ground wire, wherein said first end of said first conductor is attached to said predetermined portion of said body at a first location, said first end of said second conductor is attached to said predetermined portion of said body at a second location, and said first end of said first ground wire is attached to said predetermined portion of said body at a third location, further wherein said first, said second, and said third locations of said predetermined portion of said body are attached to said remaining portion of said body by a first connector, a second connector, and a third connector, respectively; wherein said first connector is configured to allow said first location of said predetermined portion of said body to separate from said remaining portion of said body upon the application of a first predetermined tensional force; wherein said second connector is configured to allow said second location of said predetermined portion of said body to separate from said remaining portion of said body upon the application of a second predetermined tensional force; wherein said third connector is configured to allow said third location of said predetermined portion of said body to separate from said remaining portion of said body upon the application of a third predetermined tensional force; and wherein said first and said second predetermined tensional forces are less than said third predetermined tensional force; and separating said predetermined portion of said body from a remaining portion of said body such that said first and said second conductors are electrically separated from said third and said fourth conductors, respectively, before said first ground wire separates from said second ground wire, wherein said separating further comprises:

separating said first location from said remaining portion of said body or said second location from said remaining portion of said body; and separating said third location from said remaining portion of said body after said separating of said first location or said second location from said remaining portion of said body.

2. The method of claim 1, wherein said separating said first location or said second location from said remaining portion of said body further comprises:

bending or breaking said first connector or said second connector, respectively.

3. The method of claim 2, wherein said separating said third location from said remaining portion of said body after said separating of said first location or said second location from said remaining portion of said body further comprises:

bending or breaking said third connector.

4. A method for electrically and mechanically disconnecting a pair of suspended conductors and a suspended ground wire upon the application of a tensional force on at least one of the conductors or the ground wire, comprising:

receiving a tensional force on at least one of a first conductor, a second conductor, or a corresponding first ground wire; wherein each of said first and said second conductors and said first ground wire is suspended; wherein a first end of said first conductor, a first end of said second conductor, and a first end of said first ground wire are each connected to a predetermined portion of a body, said body configured to electrically connect said first conductor to a third conductor, said second conductor to a fourth conductor, and said first ground wire to a second ground wire, wherein said first end of said first conductor is attached to said predetermined portion of said body at a first location, said first end of said second conductor is attached to said predetermined portion of said body at a second location, and said first end of said first ground wire is attached to said predetermined portion of said body at a third location, and further wherein said first, said second, and said third locations of said predetermined portion of said body are attached to said remaining portion of said body by a first connector, a second connector, and a third connector, respectively; wherein said first connector is configured to allow said first location of said predetermined portion of said body to separate from said remaining portion of said body upon the application of a first predetermined tensional force; wherein said second connector is configured to allow said second location of said predetermined portion of said body to separate from said remaining portion of said body upon the application of a second predetermined tensional force; wherein said third connector is configured to allow said third location of said predetermined portion of said body to separate from said remaining portion of said body upon the application of a third predetermined tensional force; and wherein said first and said second predetermined tensional forces are less than said third predetermined tensional force; and separating said predetermined portion of said body from a remaining portion of said body, separating said first location from said remaining portion of said body, and separating said second location from said remaining portion of said body such that said first and said second conductors are electrically separated from said third and said fourth conductors, respectively, before said first ground wire separates from said second ground wire, wherein said separating further comprises:

separating said first location from said remaining portion of said body or said second location from said remaining portion of said body; and separating said third location from said remaining portion of said body after said separating of said first location or said second location from said remaining portion of said body.

5. The method of claim 4, wherein said separating said first location from said remaining portion of said body further comprises:

bending or breaking said first connector.

6. The method of claim 5, wherein said separating said second location from said remaining portion of said body further comprises:

bending or breaking said second connector.

7. The method of claim 6, wherein said separating said third location from said remaining portion of said body after said separating of said first location and said second location from said remaining portion of said body further comprises:

bending or breaking said third connector.

8. A method for electrically and mechanically disconnecting at least one suspended conductor and a suspended ground wire, comprising:

providing a first conductor connected to a first position of a first body from a second conductor connected to a first position of a second body and a first ground wire connected to a second position of the first body from a second ground wire connected to a second position of the second body, wherein the first position of the first body is detachably connected to the first position of the second body and the second position of the first body is detachably connected to the second position of the second body;

receiving a first tensional force on the first conductor; and separating the first body from the second body at the first position such that the first conductor is electrically separated from the second conductor and the first ground wire remains electrically connected to the second ground wire unless the first ground wire receives a second tensional force greater than the first tensional force, wherein separating the first position of the first body from the first position of the second body further comprises bending or breaking a first connector configured to connect the first position of the first body to the first position of the second body and wherein separating the second position of the first body from the second position of the second body after separating the first position of the first body from the first position of the second body further comprises bending or breaking a second connector configured to connect the second position of the first body to the second position of the second body.

9. A method for electrically connecting a first conductor to a second conductor, a third conductor to a fourth conductor, and a first ground wire to a second ground wire, comprising:

connecting the first conductor to a first position of a first body;

connecting the second conductor to a first position of a second body;

connecting the third conductor to a second position of the first body;

connecting the fourth conductor to a second position of the second body;

connecting the first ground wire to a third position of the first body;

connecting the second ground wire to a third position of the second body;

detachably connecting the first position of the first body to the first position of the second body such that the first conductor remains electrically connected to the second conductor until a first tensional force is applied to the first conductor;

detachably connecting the second position of the first body to the second position of the second body such that the third conductor remains electrically connected to the fourth conductor until a second tensional force is applied to the third conductor; and detachably connecting the third position of the first body to the third position of the second body such that the first ground wire remains electrically connected to the second ground wire until a third tensional force greater than the first tensional force and the second tensional force is applied to the first ground wire and the first conductor is electrically disconnected from the second conductor and the third conductor is electrically disconnected from the fourth conductor.

10. The method of claim 9, wherein:

separating the first position of the first body from the first position of the second body comprises bending or breaking a first connector configured to detachably connect the first position of the first body to the first position of the second body.

11. The method of claim 10, wherein:
separating the second position of the first body from the second position of the second body comprises bending or breaking a second connector configured to detachably connect the second position of the first body to the second position of the second body.

12. The method of claim 10, wherein:
separating the third position of the first body from the third position of the second body after separating the first position of the first body from the first position of the second body and the second position of the first body from the second position of the second body comprises bending or breaking a third connector configured to detachably connect the third position of the first body to the third position of the second body.

13. A method for electrically connecting a first conductor to a second conductor and a first ground wire to a second ground wire, comprising:
connecting the first conductor to a first position of a first body;
connecting the second conductor to a first position of a second body;
connecting the first ground wire to a second position of the first body;
connecting the second ground wire to a second position of the second body;
detachably connecting the first position of the first body to the first position of the second body such that the first conductor remains electrically connected to the second conductor until a first tensional force is applied to the first conductor; and
detachably connecting the second position of the first body to the second position of the second body such that the first ground wire remains electrically connected to the second ground wire until a second tensional force greater than the first tensional force is applied to the first ground wire and the first conductor is electrically disconnected from the second conductor.

14. The method of claim 13, wherein:
separating the first position of the first body from the first position of the second body comprises bending or breaking a first connector configured to detachably connect the first position of the first body to the first position of the second body.

15. The method of claim 14, wherein:
separating the second position of the first body from the second position of the second body after separating the first position of the first body from the first position of the second body comprises bending or breaking a second connector configured to detachably connect the second position of the first body to the second position of the second body.

* * * * *